(12) United States Patent
Wakasugi

(10) Patent No.: US 7,227,986 B2
(45) Date of Patent: Jun. 5, 2007

(54) GRAPHIC PROCESSING METHOD AND GRAPHIC PROCESSOR AND PROCESSING SYSTEM

(75) Inventor: Nobuo Wakasugi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 989 days.

(21) Appl. No.: 10/301,339

(22) Filed: Nov. 21, 2002

(65) Prior Publication Data

US 2003/0095129 A1 May 22, 2003

(30) Foreign Application Priority Data

Nov. 21, 2001 (JP) ............... 2001-355517

(51) Int. Cl.
*G06K 9/00* (2006.01)
(52) U.S. Cl. ..................... 382/162; 358/523
(58) Field of Classification Search ........ 382/162–167, 382/173–180, 100, 169, 298–300; 358/1.1–1.9, 358/2.1, 3.01–3.02, 3.21, 1.11, 1.16, 1.17, 358/1.18, 518–523; 345/581–589, 690–691, 345/76–77; 715/700, 723
See application file for complete search history.

(56) References Cited

U.S. PATENT DOCUMENTS 5,191,444 A   3/1993  Harada et al. ............ 358/3.21
5,450,533 A * 9/1995  Takahashi et al. ......... 358/1.18
5,729,627 A * 3/1998  Mizuno et al. ............. 382/173
6,025,927 A   2/2000  Honma ..................... 358/1.18

FOREIGN PATENT DOCUMENTS

EP      1 093 298 A1    4/2001

\* cited by examiner

*Primary Examiner*—Ishrat Sherali
(74) *Attorney, Agent, or Firm*—Akin Gump Strauss Hauer & Feld LLP

(57) ABSTRACT

Bitmapped graphics, font and vector form figure are transformed to gradation value respectively by zooming means (1), font representing means (2) and vector representing means (3). They are inputted to figure conserving gradation pixel data generating means (11), where average gradation value of plural gradation values is made and each of bits is given to each of plural gradation values. These bits represent the figure of graphics. So, they are called figure bits or figure data. With appending these figure bits to the average gradation value, generated is a figure conserving gradation pixel data which represents a pixel with high resolution.

12 Claims, 24 Drawing Sheets

Fig.6(a)
DITHERED SCREEN
Fig.6(b)
FIGURE CONSERVING GRADATION PIXEL DATA
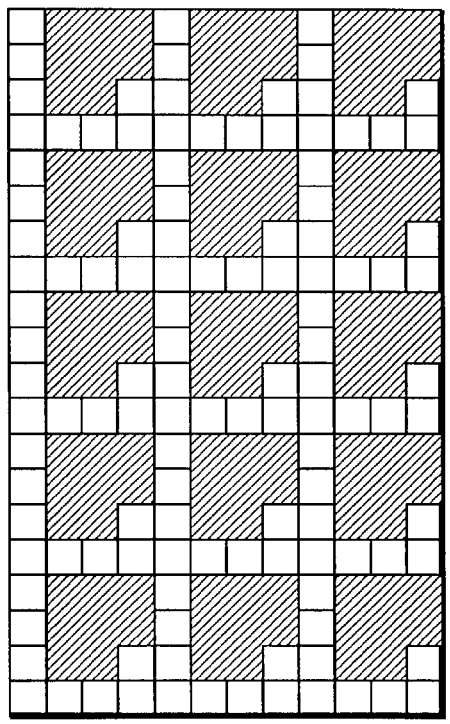
Fig.6(c)
BITMAP GRAPHICS BY EMBODIMENT 1
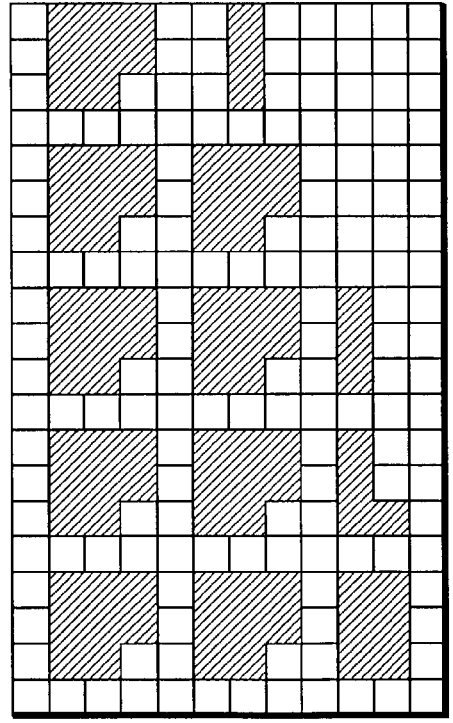
Fig.6(d)
BITMAP GRAPHICS BY EMBODIMENT 2
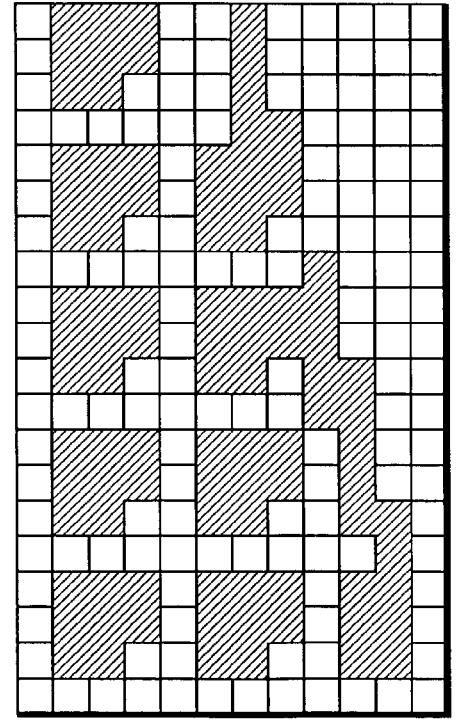

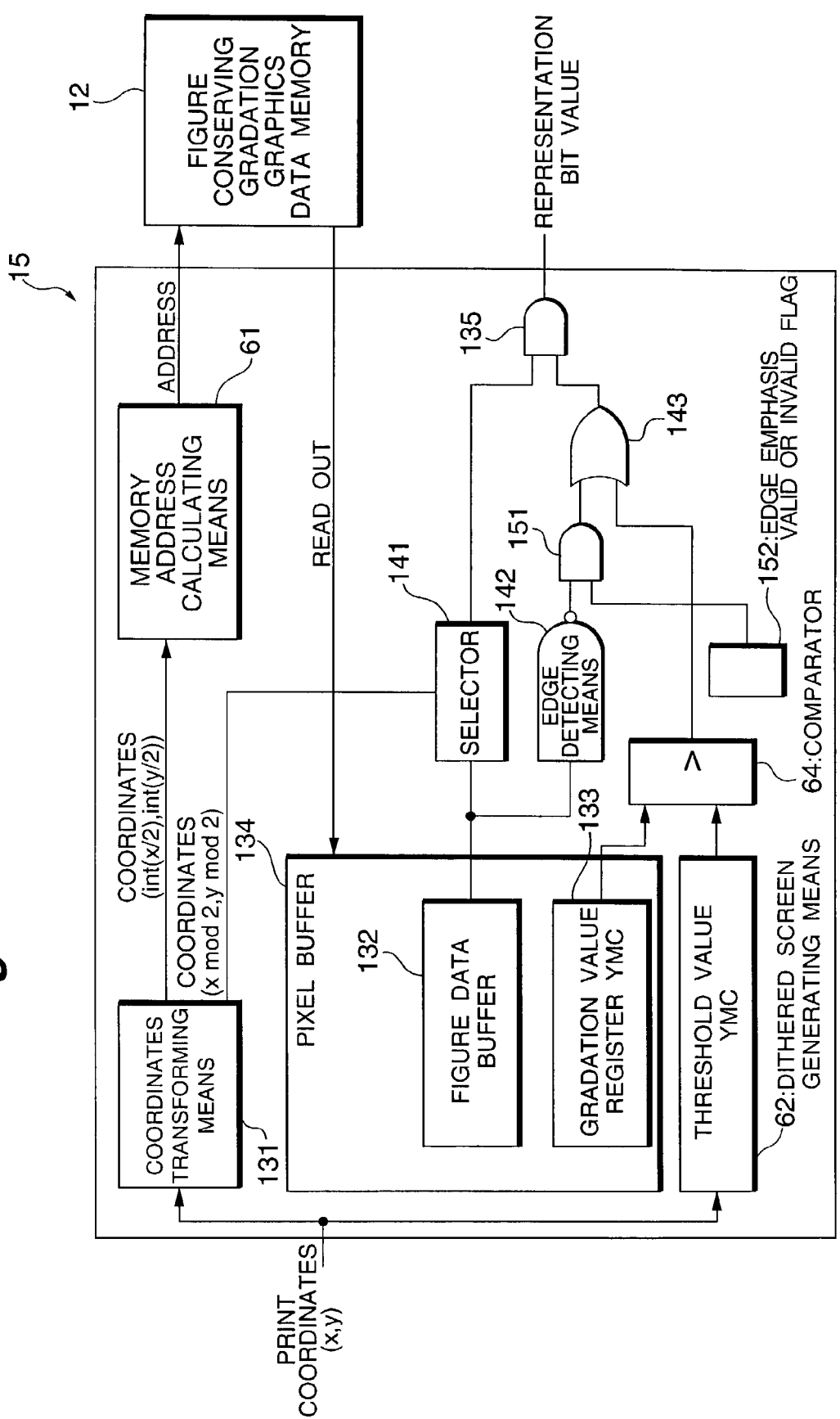

GRAPHIC PROCESSING METHOD AND GRAPHIC PROCESSOR AND PROCESSING SYSTEM

BACKGROUND OF THE INVENTION

1. Field of the Invention

The present invention relates to a graphic processing method for increasing graphic quality in for example a color printer, and a graphic processor or processing system adopting this method.

2. Description of the Related Art

FIG. 20 is a block diagram showing the outline configuration of the graphic processor in the conventional color printer. Generally, data given to printer comprise bitmap graphics data of photography etc. font data to form characters, and vector form data to represent figure. Each of these data are assembled on the same page by logical calculation of laying over to overlap with each other with half transparent paint etc. in accordance with representing order. So, all the input data need to be transformed to the same internal gradation graphics data which have same resolution. Therefore, to begin with, bitmap graphics data is inputted to a zooming means 1 for transforming it to the resolution of internal gradation graphics in printer. Font data is inputted to a font representing means 2. Vector form figure data is inputted to a vector representing means 3. And, each of inputted data are transformed to the format of internal gradation graphics data by each means respectively so as to be inputted to a gradation pixel data generating means 4.

In this occasion, the gradation pixel data generating means 4 executes logical calculation between the gradation value stored in the gradation pixel data generating means 4 and the gradation value newly obtained according to prescribed logical calculation code to generate gradation pixel data so as to perform graphic processing of laying over, painting with half transparent paint, inverting or deleting of color, etc.

FIG. 21 is a block diagram showing the configuration of gradation pixel data generating means 4. The gradation pixel data generating means 4 comprises a memory address calculating means 41 to calculate addresses in internal gradation graphics memory 5 which is determined uniquely with the input coordinates value; a pixel buffer 42 to store pixel data; and a logic calculating means 43 to perform logical calculation between the gradation value inputted from the zooming means 1, font representing means 2 and vector representing means 3 and the gradation value given from the pixel buffer 42, according to the inputted logical calculation code. To the gradation pixel data generating means 4 inputted are coordinates (x,y), gradation value, and logic calculation code in accordance with the representation order of the application document not shown in the drawings.

These coordinates (x,y), gradation value, and logic calculation code are as shown in FIG. 21 inputted respectively from the zooming means 1, the font representing means 2, and the vector representing means 3.

Here, described is an operation when a laying over figure is performed. In FIG. 21, at first, the internal gradation graphics data from zooming means 1 is stored in the internal gradation graphics data memory 5 through the logical calculating means 43 and pixel buffer 42. At second, the other internal gradation graphics data from font representing means 2 is laid over the internal gradation graphics data already stored in the int.grad.graphics data memory 5. At this time, next operation is performed. This time, the calculating code is not through, but is OR logic. And, the logical calculating means 43 operates.

A gradation value is abstracted from a pixel (which makes up graphics data) stored in the int.grad.graphics memory 5 at the address corresponding to the coordinates inputted from font representing means 2. This gradation value is inputted to the pixel buffer 42. And, OR logic calculation between the inputted gradation value from font representing means 2 and the stored gradation value in pixel buffer 42 is performed in the logical calculating means 43. And, the pixel data obtained as a result of this calculation is written back to the pixel buffer 42. When the logic calculation is finished, the pixel data stored in pixel buffer 42 is written back to the int.grad.graphics memory at the indicating address.

By the way, in the conventional graphic processor, the general format of internal gradation pixel data is as shown in FIG. 22 comprises a packed data of 24 bits consisted of each data of 8 bits which realizes 256 gradation per each color element of Y (yellow), M (magenta) and C (cyan).

This internal gradation pixel data is transformed to the bitmap color graphics corresponding to the resolution of printer by the bitmapping means 6, so as to be printed. The control of the printing operation is processed by the print controlling means 7. The print controlling means 7 outputs printing coordinates to the bitmapping means 6. The bitmap data outputted from bitmapping means 6 is sent to the print mechanism 8. The print controlling means 7 performs printing indication to the print mechanism 8, so as to print the inputted bitmap data in order of coordinates.

As a method of transforming the gradation pixel data to the bitmap graphics, here described is a method of using a dithered screen, referring to FIG. 23. FIG. 23 is a block diagram showing the configuration of bitmapping means 6. The bitmapping means 6 comprises a memory address calculating means 61 for calculating an address of int.grad.graphics memory 5 which is decided with the inputted coordinates uniquely, a pixel buffer 62 for storing the gradation value which is abstracted from the grad.pixel data of the inputted graphics data from int.grad.graphics memory 5, a dithered screen generating means 63 for generating a threshold value corresponding to this inputted coordinates value, and a comparator 64 for generating a representation bit value from the inputted gradation value from pixel buffer 62 and the inputted threshold value from dithered screen generating means 63.

1) When a pair of print coordinates (x,y) is inputted to the bitmapping means 6 from the print controlling means 7, an address of int.grad.graphics memory 5 corresponding to the coordinates (x,y) is calculated by the memory address calculating means 61. And, the pixel data of graphics data in int.grad.graphics memory corresponding to this address is read, so as to abstract the gradation value from this pixel data. This gradation value is read into the pixel buffer 62.

2) On the other hand, the print coordinates (x,y) is also inputted to the dithered screen generating means 63, so as to generate the threshold value corresponding to this coordinates value.

3) Each gradation value of YMC read in pixel buffer 62 and the corresponding threshold value generated by dithered screen generating means 63 are inputted to the comparator 64. Then, if the gradation value of pixel buffer 62 is more than or equal to the threshold value, a representation bit value "1" is put out of the comparator 64. If the gradation value of pixel buffer 62 is less than the threshold value, representation bit value "0" is put out of the comparator 64.

By the method mentioned above, gradation graphics is transformed to bitmap graphics, so as to be printed.

By the way, recently a printer with higher graphic quality like photography is demanded as color printing technique progresses. For example, the gradation number is to be improved to 24 bits and the gradation is to be improved to 1200 DPI (Dot Per Inch), or 2400 DPI so as to smooth the edges of letters.

However, 1.5 Gbytes of memory capacity is needed for representing one page of A4 size sheet when the int.grad.data format of 256 gradation 1200 DPI is adopted. As a result, the cost of memory suddenly rises. Adding to this, the speed of printing suddenly falls as a mass of graphics data is processed in printing.

On the other hand, as a characteristic of the sense of human sight, human eyes are sensitive to the gradation of graphics when the graphic density is low but the sensibility drops gradually as the graphic density increases higher. And, it is known that it reaches to bitmap level as the graphic density reached to about 600 DPI. FIG. 24 is a graph showing the relationship between the resolution and the sensible gradation number at the sight of 30 centimeter distance. As plotting a point of 256 gradation 2400 DPI for example on this graph, it will be realized that the point is far from the sensibility of human eyes and the data is prolix.

SUMMARY OF THE INVENTION

Therefore, the present invention is made in consideration of the problems included in the related art mentioned above. And, it aimed at providing graphic processing methods and graphic processor or processing system which is able to realize high graphic quality without increasing memory capacity or dropping printing performance. This is achieved by generating an internal gradation graphics data which is composed of high resolution with low gradation and low resolution with high gradation in consideration of the sensibility of human sight.

As an aspect of the present invention provided is a method for processing graphics which comprises a process of dividing bitmap graphics to be printed into groups of plural bits and deciding coloring for each of the groups of bits. And, it also comprises another process of painting away each bit directing to be painted with the decided color.

As another aspect of the present invention provided is a graphic processor for processing presentation of bitmap graphics. It comprises a gradation data generating section, a figure data generating section and a figure conserving graphics data memory. The graphic data generating section comprises a coordinates transforming means and a gradation value register, wherein a pointed region including plural first gradation data with first positioning data is read out of inputted graphics data, and second gradation data is generated from the plural first gradation data in the read out painted region. The figure data generating section comprises a coordinates transforming means and a figure data buffer, wherein figure data consisted of bits are generated corresponding to the relative coordinates in pointed region. The generation is made by comparing the first gradation data with a reference gradation data which represents for example a white color. And the figure conserving gradation graphics data memory memorizes the second gradation data and figure data of each pointed region.

As the other aspect of the present invention provided is a system of graphic processing comprising at least a CPU, a memory and a graphic processing means. The CPU executes a graphic controlling program which is stored in the memory. The graphic processing means processes a method mentioned above which is processed by for example the graphic processor mentioned above. And, the CPU processes selecting an optimum number of bits in each region according to the program.

Since the present invention adopted the method of dividing graphics into regions wherein each of the regions each certain color is assigned and the assigned color is painted according to the value of each bits in each region, a memory capacity increase is not caused and the processing speed is not dropped when a high quality graphic processing is achieved.

BRIEF DESCRIPTION OF THE DRAWINGS

FIG. 6 is showing diagrams of dithered screen pattern, figure cons.grad.pixel data, bitmap graphics by the graphic processor of Embodiments 1 and 2.

FIG. 7 is a block diagram showing a configuration of the figure conserving bitmapping means 15.

DETAILED DESCRIPTION OF THE PREFERRED EMBODIMENTS

Hereinafter, embodiments preferred by the inventor of the present invention will be described referring to the appended drawings. In this description, each element which is same as the conventional device is designated with the same reference symbol.

<Embodiment 1>

Figure 1:
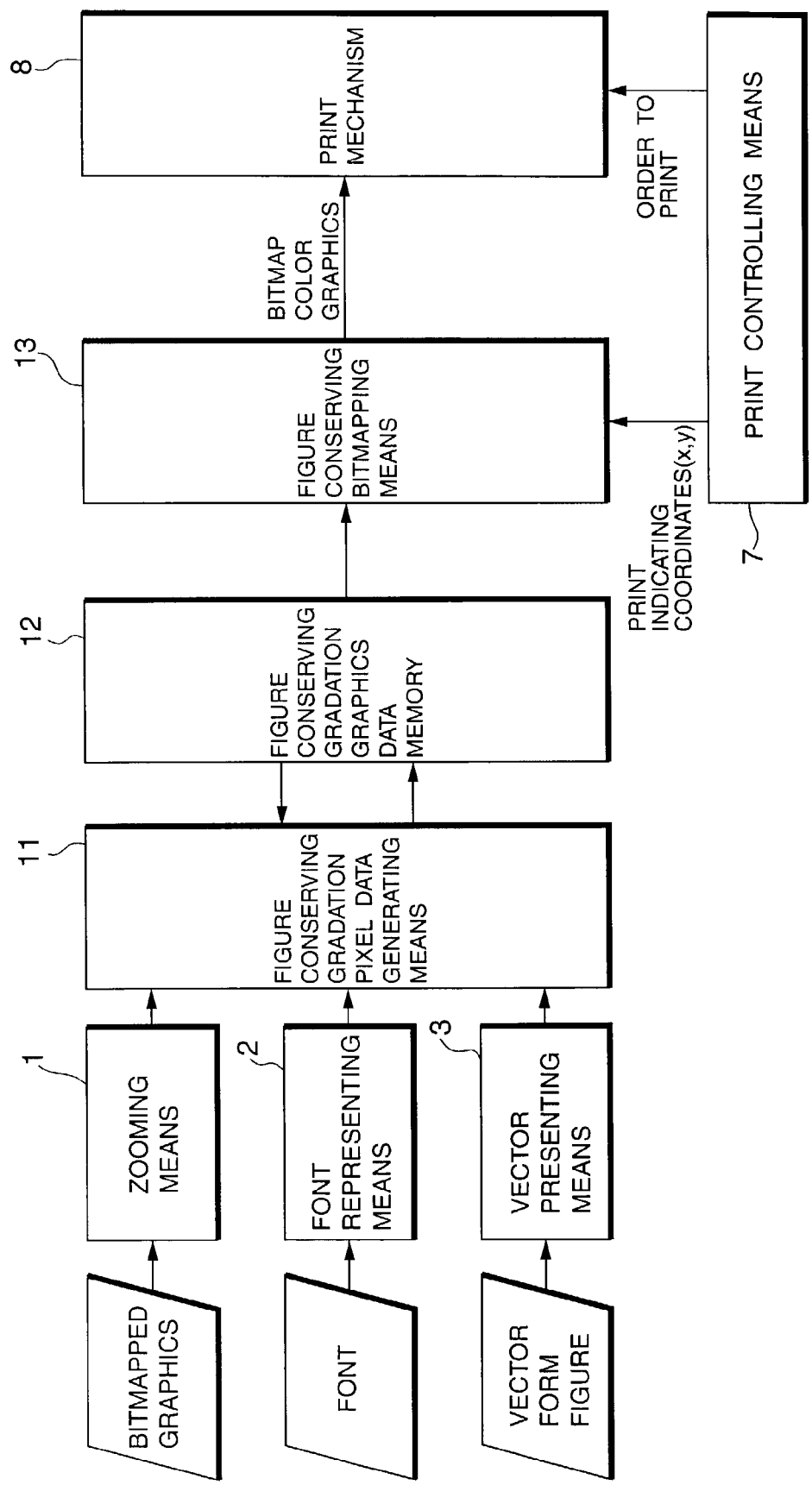
FIG. 1 is a block diagram showing an outline configuration of the graphic processor according to Embodiment 1.

FIG. 1 is a block diagram which shows the outline configuration of graphic processor according to Embodiment 1. This graphic processor comprises a zooming means 1, a font representing means 2, a vector representing means 3, a figure conserving gradation pixel data generating means 11, a figure conserving gradation graphics data memory 12, a figure conserving bitmapping means 13, a print controlling means 7 and a print mechanism 8.

The zooming means 1 is a means for transforming a bitmapped graphics to an internal gradation graphics data format of a printer.

The font representing means 2 is a means for transforming a font to an internal gradation graphics data format of a printer.

The representing means 3 is a means for transforming a vector form figure to an internal gradation graphics data format of a printer.

The figure conserving gradation pixel data generating means 11 is a means for generating a pixel data corresponding to each data inputted by the zooming means 1, the font rep. means 2 or the vector rep. means 3. This pixel data is composed of the conventional gradation value with figure bits. And, this pixel data is called a figure conserving gradation pixel, hereafter.

The figure conserving gradation graphics data memory memorizes graphics data composed of the generated figure cons.grad.pixel data.

The figure conserving bitmapping means 13 processes bitmapping of the figure cons.grad.pixel data.

The print controlling means 7 controls the printing of graphics.

The print mechanism 8 performs the printing process.

As for the graphic processor of Embodiment 1, two classes of data are used. One of them is a class of gradation representing resolution which has low density and high gradation. The other is a class of figure representing resolution which has high density and low gradation. With these classes of data, optimum graphics data is obtained corresponding to the human visual characteristics. The latter class of figure representing resolution H(DPI) is made up of 1 gradation data. And, the former class of gradation representing resolution L(DPI) is made up of M gradation data. In Embodiment 1, a figure conserving gradation graphics data is generated by compiling both classes of data. In this occasion, the data of figure representing resolution H usually decide the printing resolution of a printer.

In Embodiment 1, figure representing resolution class adopts 1200 DPI and 2 gradation. And, gradation representing resolution class adopts 600 DPI and 256 gradation. But these adoptions are matter of convenience for describing invention. So the invention is not limited to Embodiment 1.

Figure 2:
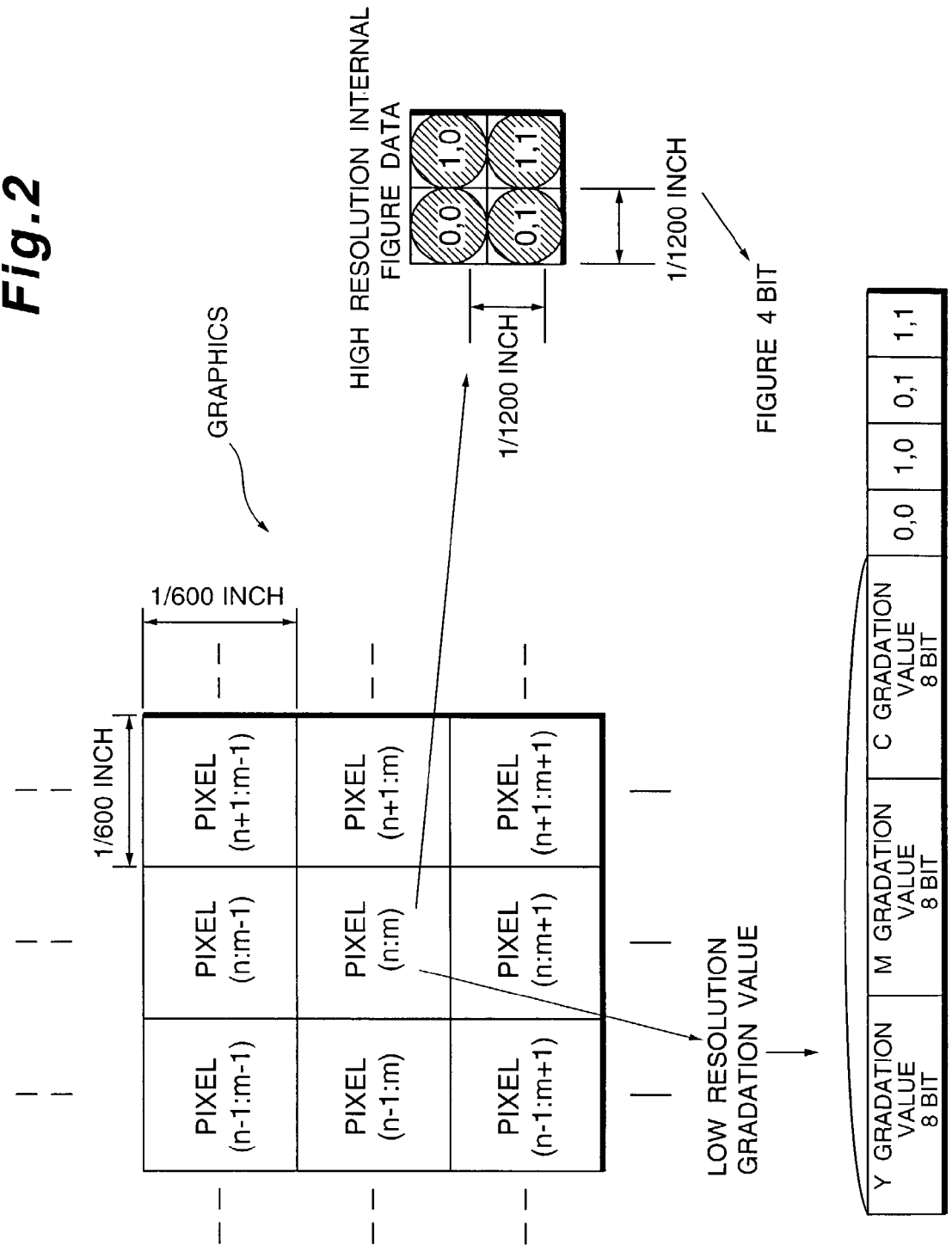
FIG. 2 is a diagram showing a format of figure conserving gradation pixel data generated by the device of Embodiment 1.

To begin with, the format of figure cons.grad.pixel data is described. As shown in FIG. 2, figure cons.grad.graphics data is composed of a figure cons.grad.pixel data with the same size of $\frac{1}{600}$ square inch. when the resolution of printer is 1200 DPI. A figure cons.grad.pixel data is composed of 600 DPI gradation value and 1200 DPI figure bits. A figure cons.grad.pixel data positioned at coordinates (n,m) is made up of a package data of 28 bits. The 24 bits of these are used for each 256 gradation color of yellow (Y), magenta (M) and cyanine (C) with 600 DPI density. And, the 4 bits of these are used for 1200 DPI figure data in each pixel with 2 gradation. In FIG. 2, relative coordinates are written in each dot of figure bits which comprise a unit pixel.

Figure 3:
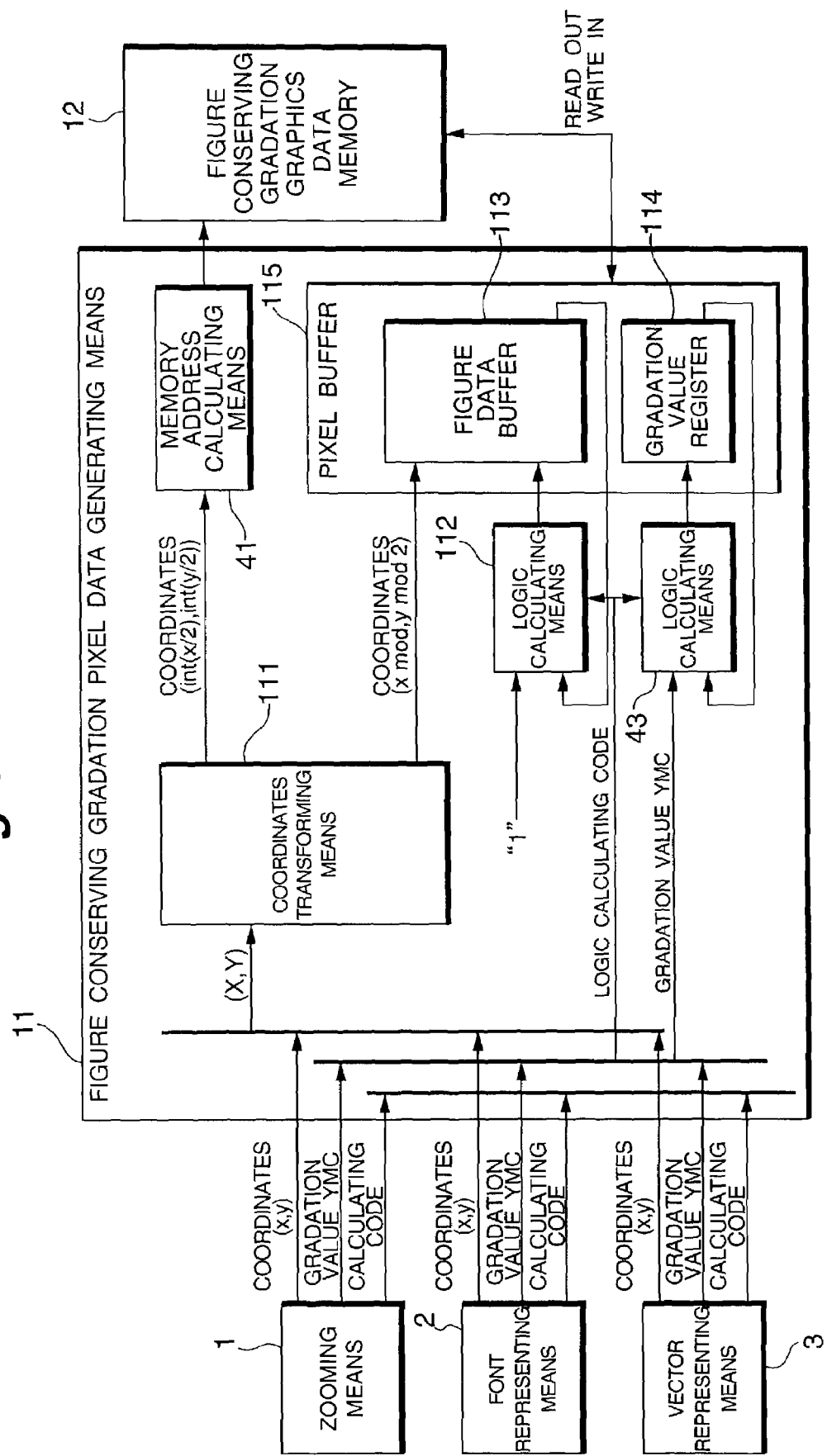
FIG. 3 is a block diagram showing a configuration of the figure conserving gradation pixel data generating means 11.

Next, the method of generating the figure conserving gradation pixel data is described. The figure cons.grad.pixel data is generated by the fig.cons.grad.pixel data generating means 11. FIG. 3 is a block diagram showing the configuration of fig.cons.grad.pixel data generating means 11. As shown in FIG. 3, the fig.cons.grad.pixel data generating means 11 comprise a coordinates transforming means 111 and another logic calculating means 112. These are newly added to the conventional gradation pixel data generating means 4 including the logic calculating means 43. Moreover, instead of pixel buffer 42 a pixel buffer 115 is comprised. This comprises a figure data buffer 113 and a gradation value register 114.

Hereinafter, process of generating a figure conserving gradation pixel data is described.

1) As shown in FIG. 1, bitmapped graphics, font and vector form figure are transformed respectively to 1200 DPI gradation graphics of printer resolution by the zooming means 1, font representing means 2 and vector representing means 3. And, the graphics is inputted into the fig.cons.grad.pixel data generating means 11. In this occasion, each pixel data included in the inputted graphics data comprises coordinates (x,y) with unit of $\frac{1}{1200}$ inch, gradation value of the pixel, and a certain calculating code.

2) The inputted coordinates (x,y) is transformed to coordinates (int(x/2), int(y/2)) of 600 DPI unit gradation representing resolution and coordinates (x mod 2, y mod 2) of 1200 DPI unit figure representing resolution. Thus, the data stream is divided into 2 kinds of branches by the coordinates transforming means 111.

3) By the memory address calculating means 41 calculated is an address in the figure cons.grad.graphics data memory 12 corresponding to the coordinates (int(x/2), int(y/2)) of 600 DPI unit gradation representing resolution. And, a pixel data included in the graphics data (corresponding to the resolution of printing mechanism 8) which is already drawn is read out from the calculated address in the fig.cons.grad.graphics data memory 12. The read out pixel has a format shown in FIG. 2. It comprises figure bits and gradation value. The figure bits are stored in the figure data buffer 113 of the pixel buffer 115. And, the gradation value is stored in the gradation value register 114 of the pixel buffer 115.

4) A bit corresponding to coordinates (x mod 2, y mod 2) among the four bits of figure bits which are stored in the figure data buffer 113 by the above mentioned process is read out so as to be inputted in the logic calculating means 112. In the logic calculating means 112, a logic calculation between the read out bit from figure data buffer 113 and a prescribed inputted value "1" is processed according to a prescribed logic calculating code.

5) The contents of gradation value register 114 are inputted in the logic calculating means 43 at the same time of the process in the above item 4).

The logic calculating means 43 processes a logic calculation between the data from gradation value register 114 and the gradation value YMC inputted from zooming means 1, font representing means 2 and vector representing means 3 according to a prescribed calculating code.

An example of the output of gradation value and its calculating process is as follows.

As shown in FIG. 2, the gradation values of each color of each coordinates are inputted as follows when m=0 and n=0.
 coordinates (m, n) (Y00, M00, C00)
 coordinates (m, n+1)=(Y01, M01, C01)
 coordinates (m+1, n)=(Y10, M10, C10)
 coordinates (m+1, n+1)=(Y11, M11, C11)

And, the gradation values (Yg, Mg, Cg) are calculated from the average of the gradation values of each color of YMC as follows.
 Yg=(Y00+Y01+Y10+Y11)/4
 Mg=(M00+M01+M10+M11)/4
 Cg=(C00+C01+C10+CY11)/4

Next, an example of the output of figure data is described.

The figure data is calculated from the relation between the gradation values (Yg, Mg, Cg) and the gradation values of each color of YMC of each coordinates as follows.
 if (Y00−Yg)+(M00−Mg)+(C00−Cg)≧0 then F00=1
 if (Y00−Yg)+(M00−Mg)+(C00−Cg)<0 then F00=0
 if (Y01−Yg)+(M01−Mg)+(C01−Cg)≧0 then F01=1
 if (Y01−Yg)+(M01−Mg)+(C01−Cg)<0 then F01=0
 if (Y10−Yg)+(M10−Mg)+(C10−Cg)≧0 then F10=1
 if (Y10−Yg)+(M10−Mg)+(C10−Cg)<0 then F10=0
 if (Y11−Yg)+(M11−Mg)+(C11−Cg)≧0 then F11=1
 if (Y11−Yg)+(M11−Mg)+(C11−Cg)<0 then F11=0

In this calculation, the figure data F00, F01, F10 and F11 correspond to the coordinates in FIG. 2 as follows.
 (0, 0)=F00
 (1, 0)=F10
 (0, 1)=F01
 (1, 1)=F11

6) Next, the output (a figure bit) of logic calculating means 112 is inputted into the bit corresponding to coordinates (x mod 2, y mod 2) in figure data buffer. At the same time, the output (gradation value) of logic calculating means 43 is put in the gradation value register 114.

7) After these processes, a figure conserving gradation pixel data which comprises figure bits and gradation value is generated. And, this bit of fig.cons.grad.pixel data is written at the above calculated address in fig.cons.grad.graphics data memory 12.

Figure 22:
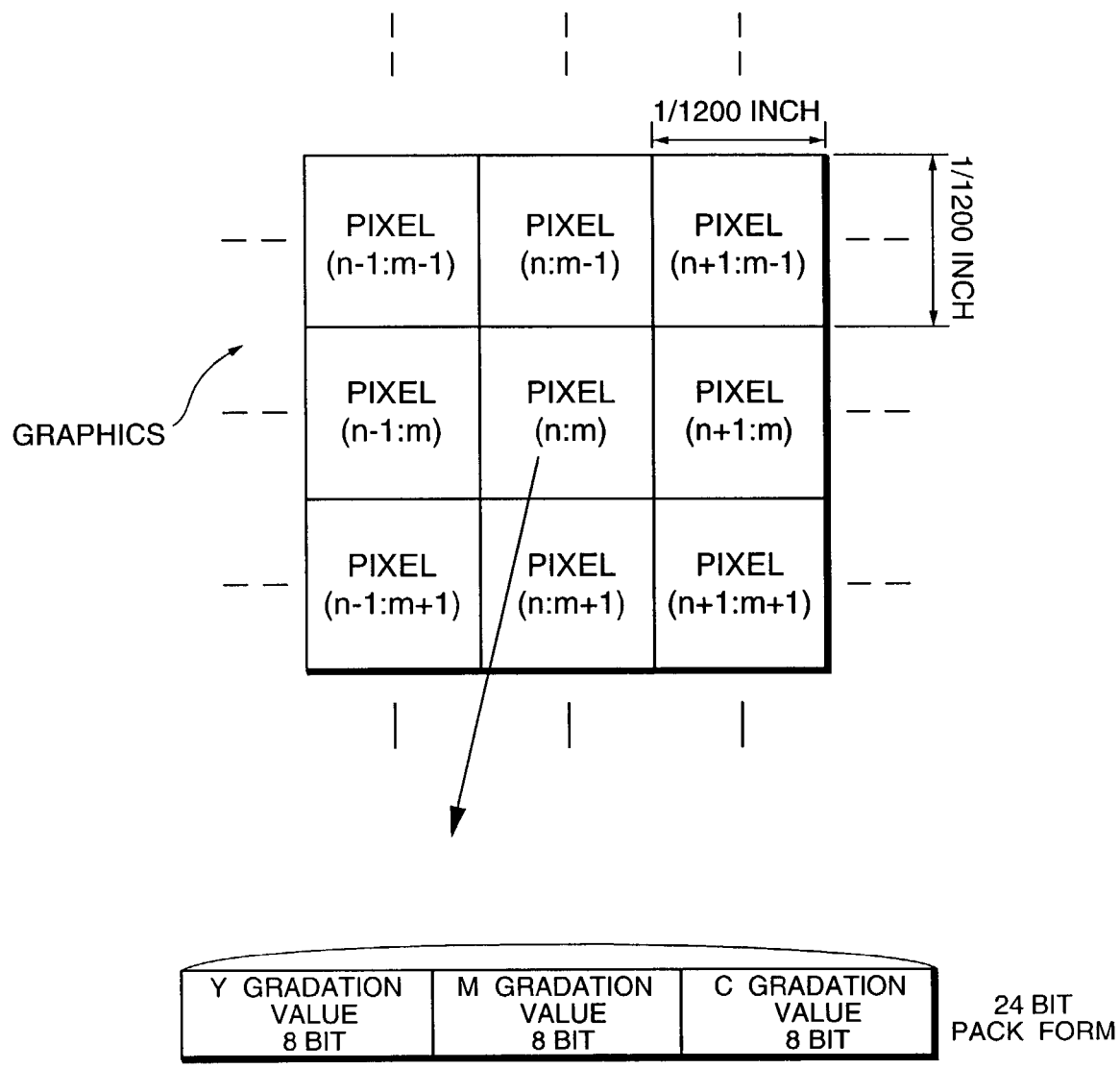
FIG. 22 is a diagram showing a format of gradation pixel data generated by the conventional device.
Figure 23:
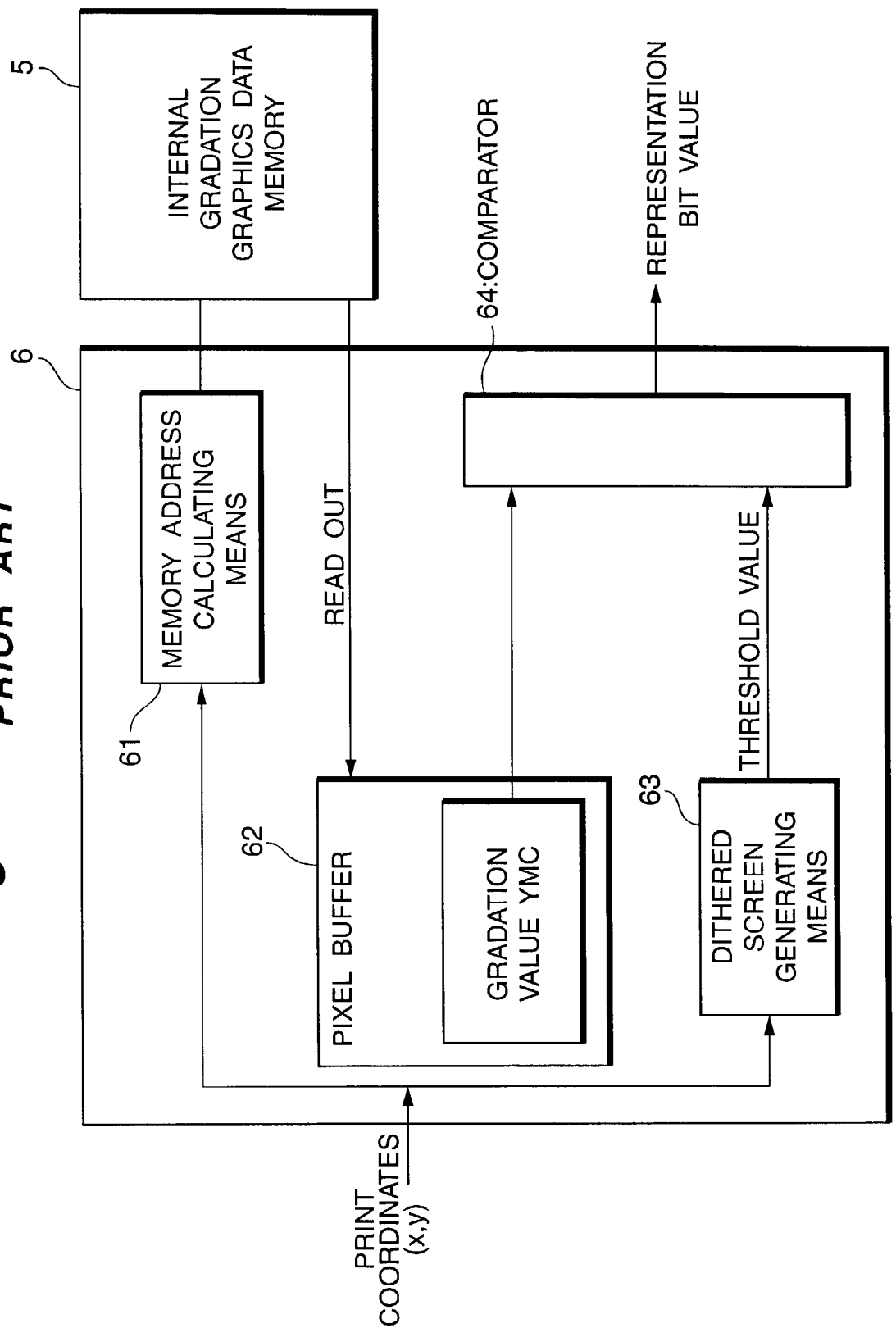
FIG. 23 is a block diagram showing a configuration of the conventional bitmapping means.
Figure 24:
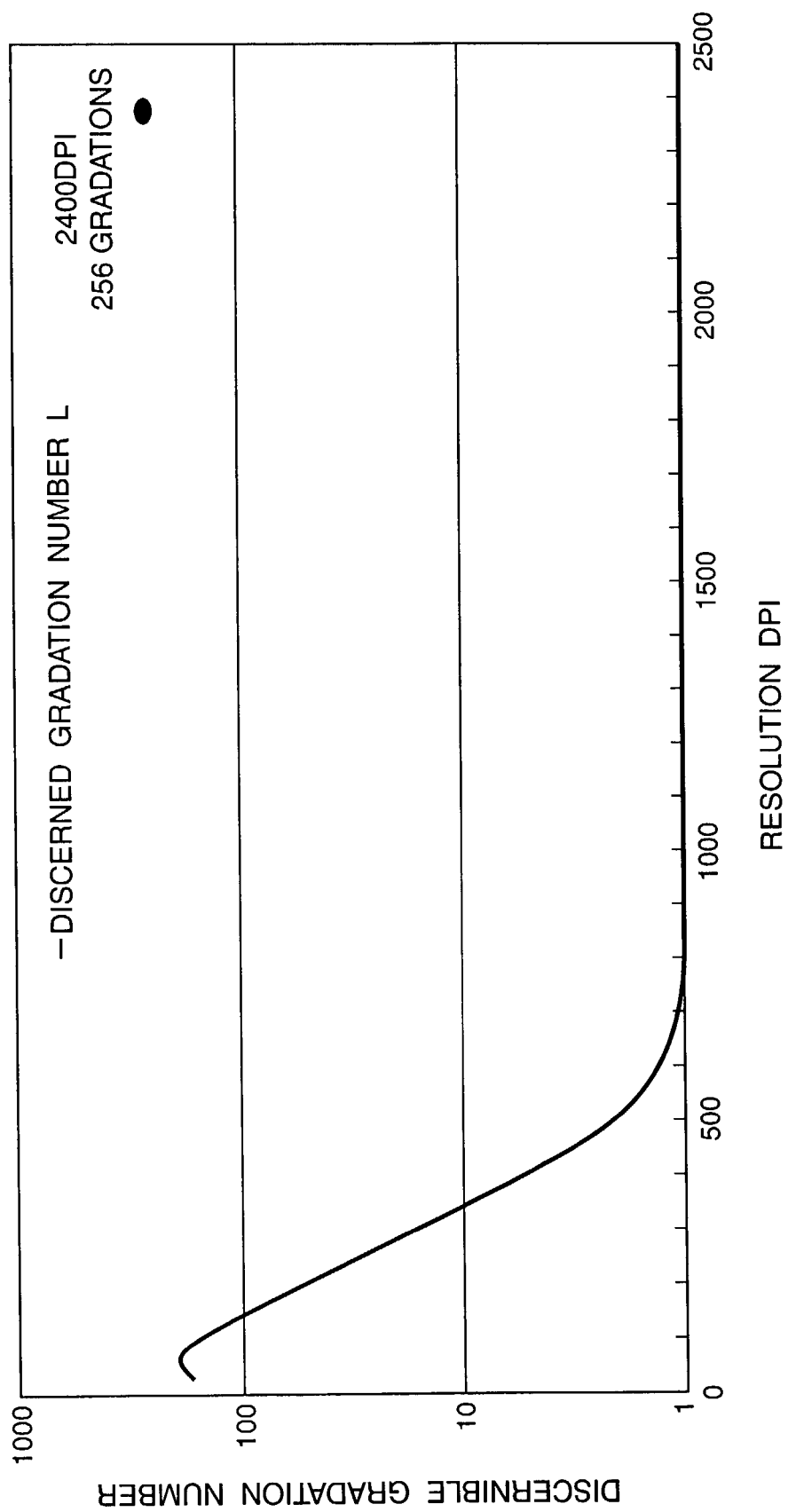
FIG. 24 is a graph showing the relation between resolution and discernible gradation number of a human at the view point of 30 centimeter distance.

In this occasion, a figure conserving gradation pixel data is bitmap data comprised of more than 1 bit, which is 1 bit of binary digit as monochrome graphics. Instead, as color graphics, it is comprised of each 8 bits of YMC as shown in FIG. 2 or FIG. 22.

Next, the method of transforming this fig.cons.grad.pixel data into bitmap graphics is described. The fig.cons.grad.pixel data is transformed into bitmap graphics by the figure conserving bitmapping means 13. In this occasion, a method with dithered screen is adopted.

Figure 4:
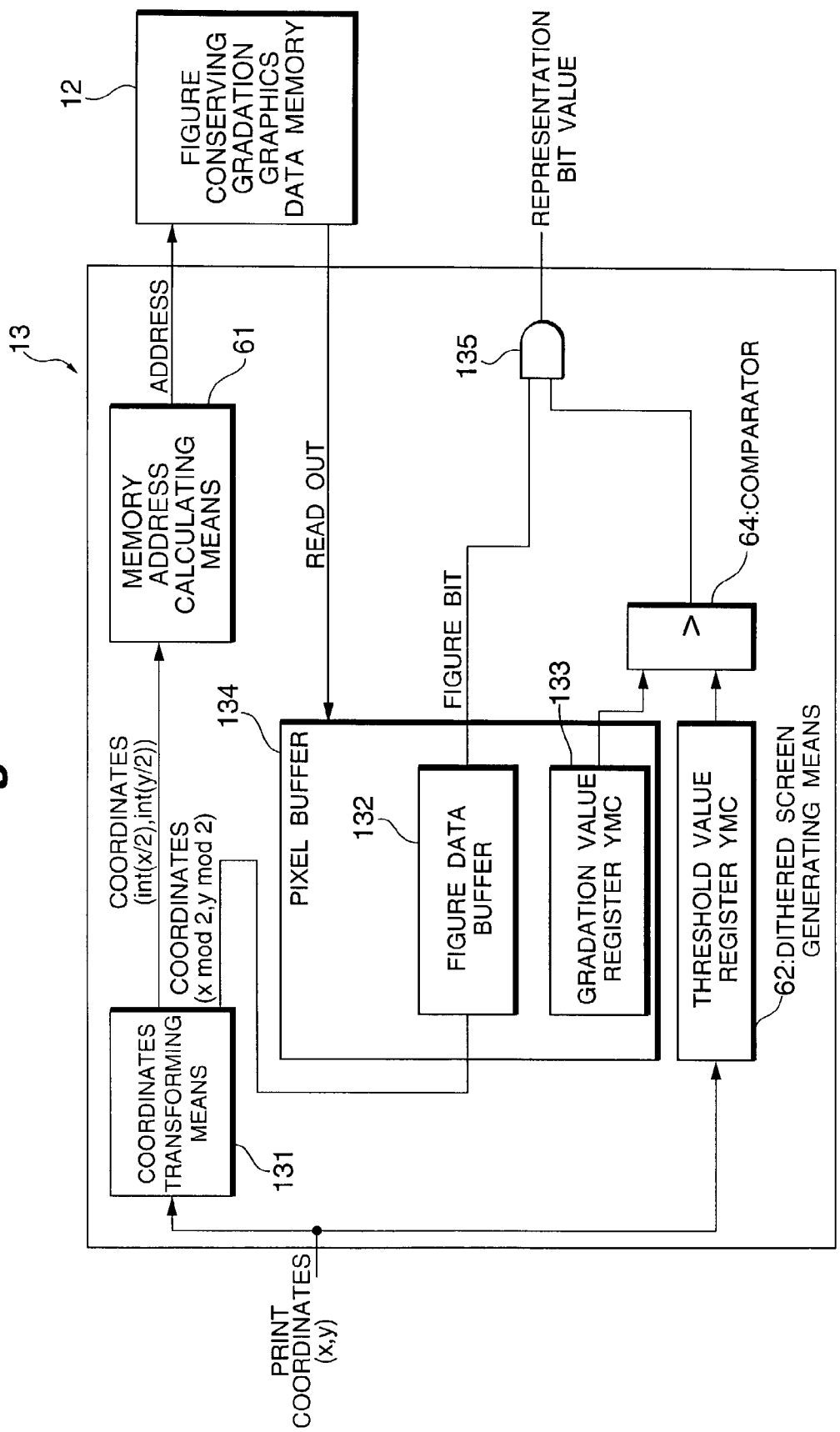
FIG. 4 is a block diagram showing a configuration of the figure conserving bitmapping means 13.

FIG. 4 is a block diagram showing a configuration of fig.cons.bitmapping means 13. As shown in FIG. 4, the fig.cons.bitmapping means 13 comprises a coordinates transforming means 131 which is newly added to the conventional bitmapping means 6 described before. Moreover, instead of pixel buffer 62 a pixel buffer 134 which comprises a figure data buffer 132 and a gradation value register 133. Besides, it is made up to put each output of the figure data buffer 132 and the comparator 133 in an AND gate which is newly equipped so as to obtain a representation bit value.

Hereinafter, the processes of transforming figure conserving gradation pixel data into bitmap graphics are described.

1) As shown in FIG. 4, print coordinates (x,y) which are inputted from the print controlling means 7 are transformed into coordinates (int (x/2), int (y/2)) of gradation representing resolution and coordinates (x mod 2, y mod 2) of figure representing resolution by the coordinates transforming means 131.

2) Next, an address in the fig.cons.grad.graphics data memory 12 corresponding to the coordinates (int(x/2), int(y/2)) of gradation representing resolution is calculated by the memory address calculating means 61. And, the pixel data which is stored at the calculated address in figure cons.grad.graphics data memory 12 is read out. The figure bits of the read out pixel data is stored in the figure data buffer 132. And, the gradation value of it is stored in the gradation value register 133.

3) On the other hand, the dithered screen generating means 62 puts out a threshold value corresponding to print coordinates (x,y), when it is inputted with the coordinates.

4) The comparator 64 is inputted with the threshold value and the output value from the gradation value register 133 of pixel buffer 134. And, if the output value of gradation value register 133 is more than or equal to the threshold value, the comparator puts out "1". Otherwise, it puts out "0".

5) When a signal "1" is put out from the comparator 64, a representation bit value "1" is put out from AND gate 135. On the other hand, when a signal "0" is put out from the comparator 64, a representation bit value "0" is put out from AND gate 135. And, this representation bit value is sent as bitmap graphics data to the print mechanism 8, so as to process printing.

The graphic processor of Embodiment 1 is able to cut down the quantity of internal intermediate graphics data of printer to less than ¼ compared with the conventional processor which holds the gradation pixel data of printing resolution as it is, when the graphic processor of Embodiment 1 uses figure conserving gradation pixel data generated by it, because it is able to add the figure bits into the gradation pixel data of low resolution which is lower than printing resolution so as to increase resolution of edge of letters, symbols etc. For example, if it is a processor of 1200 DPI resolution class printer, it can cut it down to an amount of 400 M Bytes according to Embodiment 1 while data of 1.5G Bytes per a page is needed in conventional processor. Thus, the cost for memory is cut down. Moreover, the processor of Embodiment 1 is able to greatly contribute to make the printing speed more than 4 times faster because graphic data quantity is less than 4 times less.

<Embodiment 2>

By the figure conserving bitmapping means 13 shown in Embodiment 1, the resolution of edges of font etc. is expected to increase with the figure bits. However, some dots are likely to drop at edges as a result of coming out the pattern of dithered screen at the edge portions when the density becomes a little thinner owing to the screen bit configuration of dithered screen used by the figure conserving bitmapping means 13.

Therefore, to avoid this defect, the graphic processor of Embodiment 1 is equipped with means for judging whether data is edge or not by looking into the figure bits in advance, so as to be able to print smooth edges of a figure.

Figure 5:
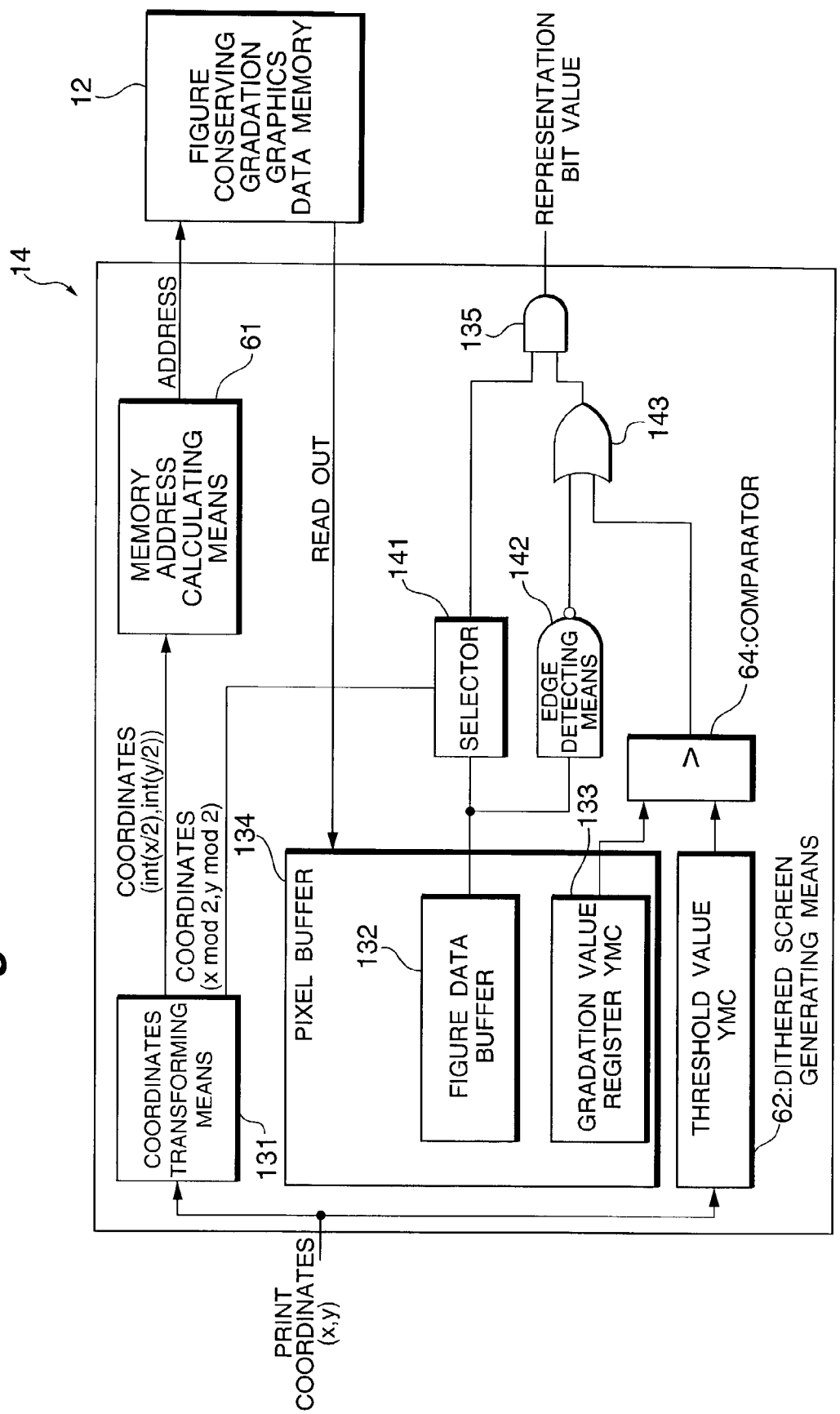
FIG. 5 is a block diagram showing a configuration of the figure conserving bitmapping means 14.

FIG. 5 is a block diagram showing the configuration of figure conserving bitmapping means of the graphic processor according to Embodiment 2. This figure cons.bitmapping means 14 is equipped with three new elements as well as the same elements in the figure cons.bitmapping means 13 according to Embodiment 1. First is a selector 141 which selects input or output of the figure data buffer 132. Second is an edge judging means 142 which comprises NAND logic circuit for judging the edge of a figure or not. Third is an OR gate 143 which is inputted with the output of edge judging means 142 and the output of comparator 64. And, the output of it is put in one of the input terminal of AND gate 135. The other configuration of the device is same as Embodiment 1.

Hereinafter, described is the process for transforming figure conserving gradation pixel data into bitmap graphics by the figure cons.bitmapping means 14 when the figure cons.grad.pixel data is generated as well as Embodiment 1.

1) As shown in FIG. 5, when the print coordinates (x,y) is inputted from the print controlling means 7, it is transformed into a coordinates (int(x/2), int(y/2)) of gradation representing resolution and coordinates (x mod 2, y mod 2) of figure representing resolution by the coordinates transforming means 131.
2) Next, by memory calculating means 61 calculated is an address in figure cons.grad.graphics data memory 12 corresponding to the coordinates (int(x/2), int(y/2)) of gradation representing resolution.
   And, read out is a pixel data which is stored at the address in figure cons.grad.graphics data memory 12. The figure bits of the read out pixel data is stored in the figure data buffer 132 of pixel buffer 134. And, the gradation value of it is stored in the gradation value register 133 of pixel buffer 134.
3) On the other hand, in dithered screen generating means 63, the threshold value corresponding to print coordinates (x,y) is put out when the coordinates (x,y) is inputted.
4) The threshold value and the output value from gradation value register 133 of pixel buffer 134 are inputted to comparator 64. And the output value of gradation value register 133 is more than or equal to the threshold value, value "1" is put out of comparator 64. Otherwise, value "0" is put out.
5) Usually, the output of comparator 64 and the output of figure data buffer 132 are added logically by AND gate 135. And, the output value of AND gate 135 is put out as bitmap graphics data to the print mechanism so as to print it.
6) But, when edge judging means 142 confirmed the existence of edge with figure bits given, that is, when edge judging means 142 confirmed the existence of "0" with the output bit of figure data buffer 132, edge judging means 142 judges that an edge is included in it. And, edge judging means 142 puts out "1". When the output value of edge judging means 142 became "1", the representation bit value put out of AND gate 135 always becomes "1". By these processes, edges of figure are always represented in good shape with smooth outline.

FIG. 6 shows graphics outputted by the graphic processor of Embodiment 2. FIG. 6 also shows graphics outputted by the graphic processor of Embodiment 1 for reference. In FIG. 6, shown is the difference of both bitmap graphics outputted when a trapezoid is drawn. FIG. 6(a) shows a dithered screen pattern, FIG. 6(b) shows figure conserving gradation pixel data as a result of drawing a trapezoid, FIG. 6(c) shows bitmap graphics by the graphic processor of Embodiment 1, and FIG. 6(d) shows bitmap graphics by the graphic processor of Embodiment 2.

In FIG. 6(b), each box of figure conserving gradation pixel data represents a pixel. The number in each box represents a gradation value. 55H and 00H are represented in FIG. 6(b). These are formats of 8 bits for monochrome. Instead, formats of 24 bits are adopted for color printing. And, four circles in each box represent a figure data. Here, the black circle represents "1" and the white circle represents "0". The graphic processor of Embodiment 2 puts out graphics by using dithered pattern and figure conserving gradation pixel data as well as the processor of Embodiment 1. The bitmap graphics according to the graphic processor of Embodiment 1 (FIG. 6(c)) becomes discontinuous at the edge portion of the figure owing to the dithered pattern. But, the bitmap graphics according to the graphic processor of Embodiment 2 (FIG. 6(d)) becomes continuous at the edge portion to improve the shape with smooth outline. On the other hand, the same gradation if FIG. 6(c) is remained inside of the edge portion of figure as shown in FIG. 6(d).

<Embodiment 3>

Although the processor of Embodiment 2 is effective to bring up gradation at edge portion of figure so as to make smooth outline, it has a defect that the color of the outline portion of figure stands out in contrast with the color of the inside part of figure. Therefore, in Embodiment 3, provided is a graphic processor which is able to select emphasis at the outline of figure or not if necessary.

FIG. 7 is a block diagram showing the configuration of figure conserving bitmapping means of the graphic processor according to Embodiment 3. This figure conserving bitmapping means 15 is made up by newly equipping AND gate 151 and edge emphasis valid or invalid flag 152 with the figure conserving bitmapping means 14 of Embodiment 2. One input terminal of AND gate 151 is connected with the output terminal of edge detecting means 142. And, the other input terminal of AND gate 151 is connected with the output terminal of edge emphasis valid or invalid flag. The output of AND gate 151 is connected to one input terminal of OR gate 143. In addition, data is able to be written in the edge emphasis valid or invalid flag 152 by CPU not shown in the drawings. The other configuration is same as that of Embodiment 2.

Hereinafter, described is the processes of transforming figure conserving gradation graphics data into bitmap graphics by the figure conserving bitmapping means 15 when the figure conserving gradation pixel data is generated similarly as Embodiment 2.

1) As shown in FIG. 7, when print coordinates (x,y) is inputted from the print controlling means 7, it is transformed into two pairs of coordinates by the coordinates transforming means 131. One is a pair of coordinates (int(x/2), int(y/2)) of gradation representing resolution. The other is a pair of coordinates (x mod 2, y mod 2) of figure representing resolution.
2) Next, an address in the figure cons.grad.graphics data memory 12 corresponding to coordinates (int(x/2), int(y/2)) of gradation representing resolution is calculated by the memory address calculating means 61. And, read out at the calculated address in figure cons.grad.graphics data memeory 12 is a pixel data stored there. The read out pixel data is divided into figure bits and gradation value. The former is stored in figure data buffer 132 of pixel buffer 134. The latter is stored in gradation value register 133 of pixel buffer 134.
3) On the other hand, in dithered screen generating means 63, the threshold value corresponding to print coordinates (x,y) is put out when the coordinates (x,y) is inputted.
4) The threshold value and the output value from gradation value register 133 of pixel buffer 134 is inputted to comparator 64. And, if the output value from gradation value register 133 is more than or equal to the threshold value, the comparator 64 puts out "1". Otherwise, it puts out "0".

5) The edge judging means 142 looks into figure bits given, so as to judge whether the figure bits is representing edge or not. That is, it looks into each bit of the figure bits whether the bit is "1" or "0". If all the bits are "1", it is not an edge.

6) When the edge judging means 142 could not find any "0" in figure bits, it judges that the pixel data including the figure bits does not represent an edge. That is, the pixel data represents the inside or the outside of edges. In this occasion, the judging means 142 puts out a signal "0". And, this signal "0" is put in OR gate 143 via AND gate 151. So edge emphasis is not processed in this occasion.

7) On the other hand, when the edge judging means 142 found "0" existing in the output bit of figure data buffer 132, it judges that the figure bits represents an edge. In this occasion, the edge judging means 142 puts out a signal "1". At the same time when the edge emphasis valid or invalid flag is putting out signal "1", which is inputted to the OR gate 143 for outputting, so as to process edge emphasis similarly to Embodiment 2. On the other hand, when edge emphasis valid or invalid flag is set to put out signal "0", the edge emphasis similar to Embodiment 2 is not processed even if existence of edge is judged because the OR gate 143 is inputted signal "0" by the AND gate 151.

<Embodiment 4>

The processor of Embodiment 2 has a defect of standing out the color of outline portion of figure in contrast with the color of inside of figure though it is effective to form smooth outlines with high resolution of graphic edges. On the other hand, the processor of Embodiment 3 is not able to alter selection of emphasizing edge or not in the course of printing process after the selection is made. As a result of this, when the gradation value is low that is the color is thin, the graphic quality is decreased as the figure outline stands out owing to the edge emphasis, though the edge emphasis is effective to increase the graphic quality when the gradation in graphics is high that is the color is thick.

Therefore, Embodiment 4 is made up to alter outline emphasis corresponding to the gradation value in graphics, considering the fact that smoothing the edges of thin color graphics cannot improve the appearance of figure in human sight because of human visual characteristic. That is, the graphic processor of Embodiment 4 processes outline emphasis with thick color graphics. While it forbids outline emphasis with thin color graphics. Thus, it is made up to be able to perform selective graphic process, so as to enable the printing process with high quality.

Figure 8:
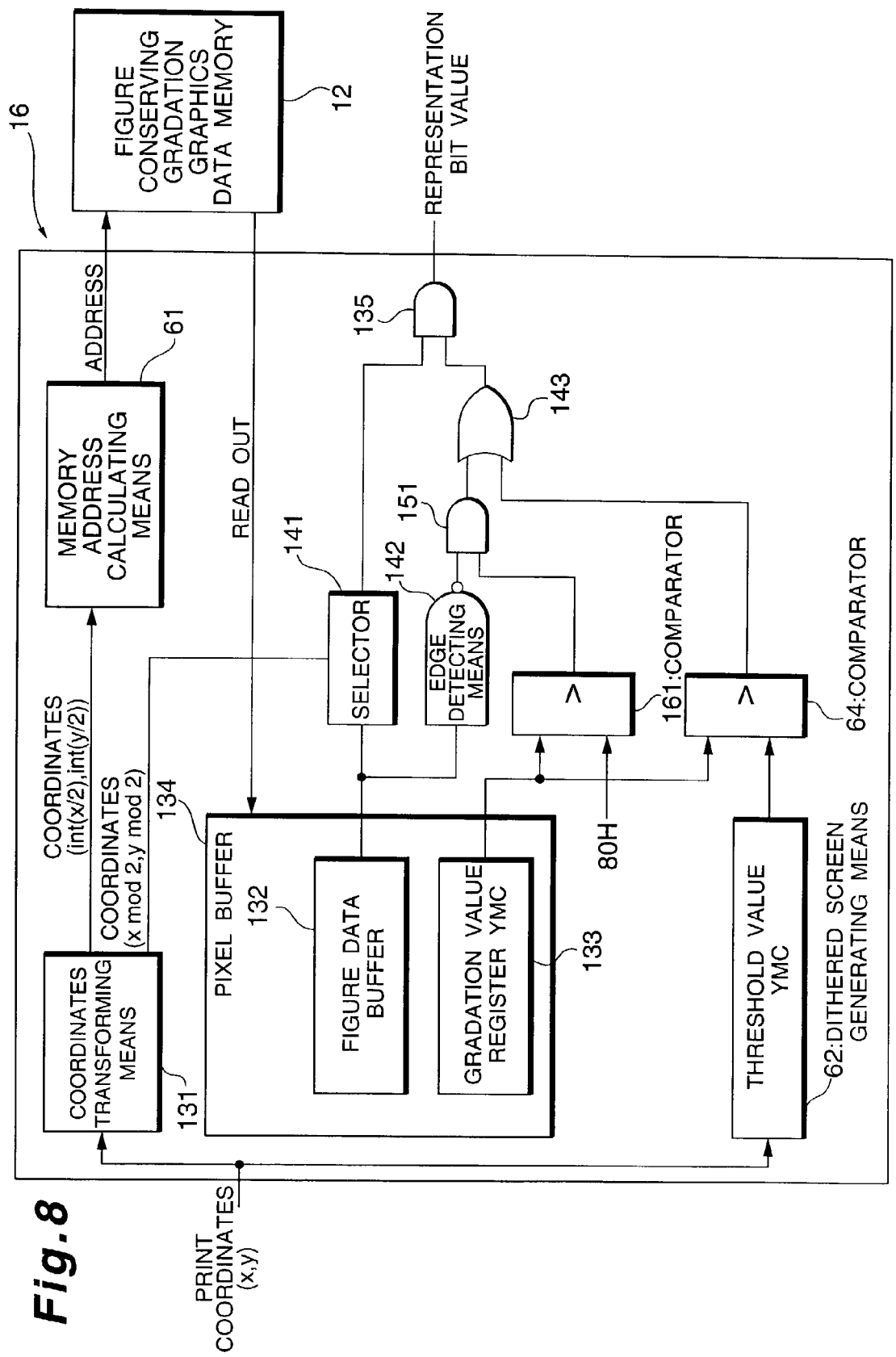
FIG. 8 is a block diagram showing a configuration of the figure conserving bitmapping means 16.

FIG. 8 is a block diagram showing the configuration of the figure conserving bitmapping means of graphic processor according to Embodiment 4. This figure cons.bitmapping means 16 comprises a comparator 161 newly equipped instead of the edge emphasis valid or invalid flag 152 which was equipped in the graphic processor of Embodiment 3. And, it is made up to always input "80H" with one of input terminal of comparator 161. Besides, the other input terminal of comparator 161 is connected to the output terminal of gradation value register 133. Moreover, the output of comparator 161 is inputted to AND gate 151. The other configuration of the processor is same as the processor shown in Embodiment 2.

In the graphic processor of Embodiment 4, the gradation value of pixel data is compared with "80H" by the comparator 161. And, if the gradation value of pixel data is more than this value, the comparator 161 puts out signal "1". When the output signal of comparator 161 is "1", the edge emphasis of bitmap graphics with the representation bit value finally put out form AND gate 135 is made valid as same as it is when the edge emphasis valid or invalid flag 152 outputted signal "1" in the processor shown in Embodiment 3.

In contrast to this, when the gradation value of pixel data is less than "80H", the comparator 161 puts out signal "0". So, the edge emphasis of bitmap graphics with the representation bit value outputted finally from AND gate 135 is not processed.

<Embodiment 5>

Figure 9:
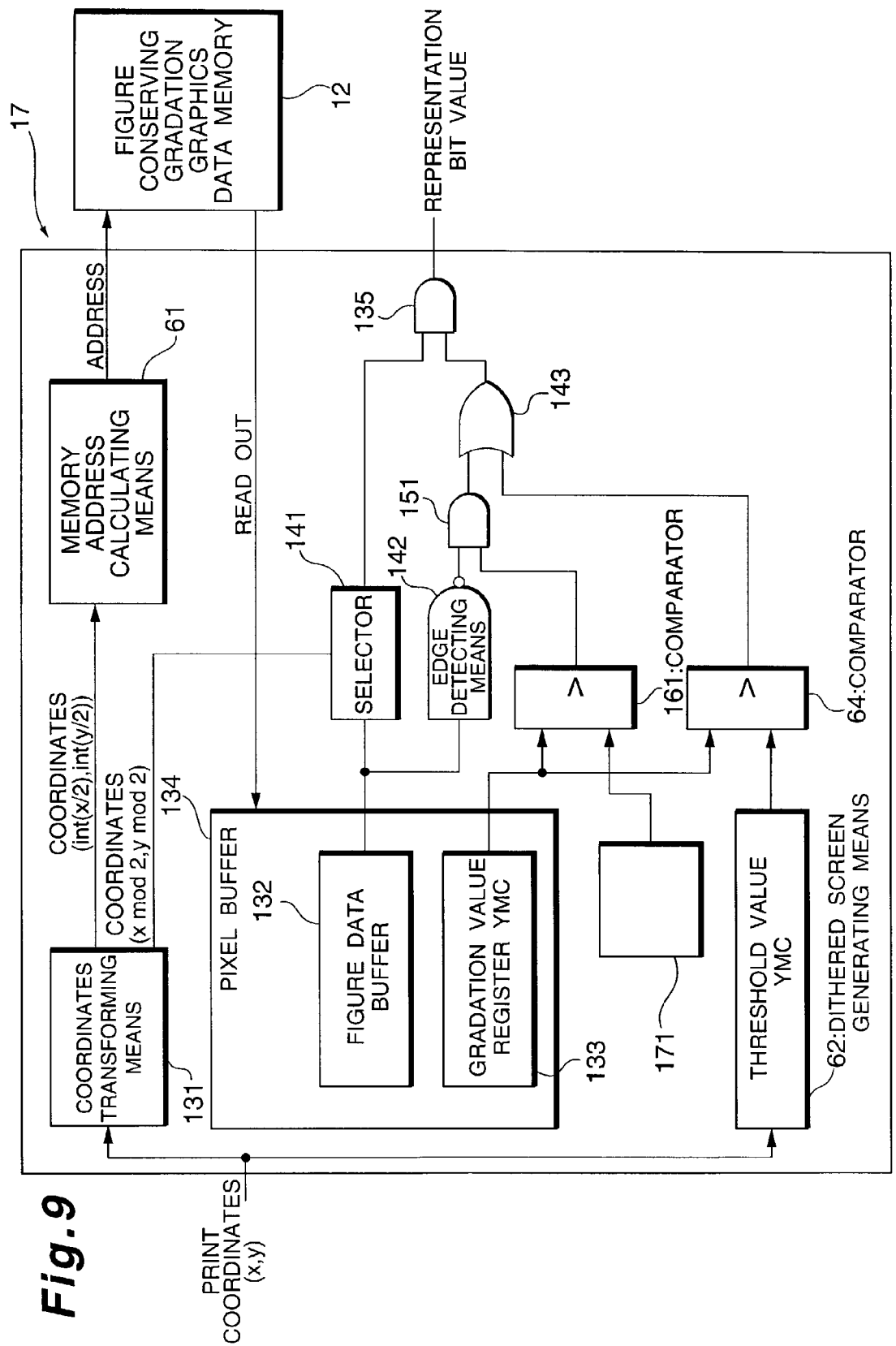
FIG. 9 is a block diagram showing a configuration of the figure conserving bitmapping means 17.

FIG. 9 is a block diagram showing the configuration of figure conserving bitmap means of graphic processor according to Embodiment 5. This figure cons.bitmap means 17 further comprises an edge emphasis valid gradation value register 171 equipped to the same processor as Embodiment 4. A data is able to be written in the edge emphasis val.grad.val.register 171 by CPU not shown in the drawings. And, the output terminal of edge emphasis val.grad.val.register 171 is connected to one of the input terminal of comparator 161. Moreover, the other input terminal of comparator 161 is connected with the output terminal of gradation value register 133.

In the processor of Embodiment 5, the comparator 161 compares the output value of edge emphasis val.grad.val.register 171 with the output value of gradation value register 133 (gradation value of pixel data). And, if the gradation value of pixel data is more than the output value of edge emphasis val.grad.val.register 171, the comparator 161 puts out signal "1". When the output signal of comparator 161 is "1", the edge emphasis of bitmap graphics with the representation bit value outputted finally from AND gate 135 is made valid as same as when the output value from edge emphasis valid or invalid flag 152 was "1" in the processor of Embodiment 3.

In contrast to this, the gradation value of pixel data is less than the output value from edge emphasis val.grad.val.register 171, the comparator 161 puts out signal "0". So, the edge emphasis of bitmap graphics with the representation bit value outputted finally from AND gate 135 is not processed.

The processor of Embodiment 5 is able to control validity of outline emphasis according to the circumstances of graphic color by equipping the edge emphasis val.grad.val.register 171 which is able to freely set reference gradation value of pixel data by program. This is different from the processor of Embodiment 4, which selectively controls between only two processes. One is to process outline emphasis against thick color graphics. The other is to process forbidding outline emphasis against thin color graphics.

<Embodiment 6>

Figure 10:
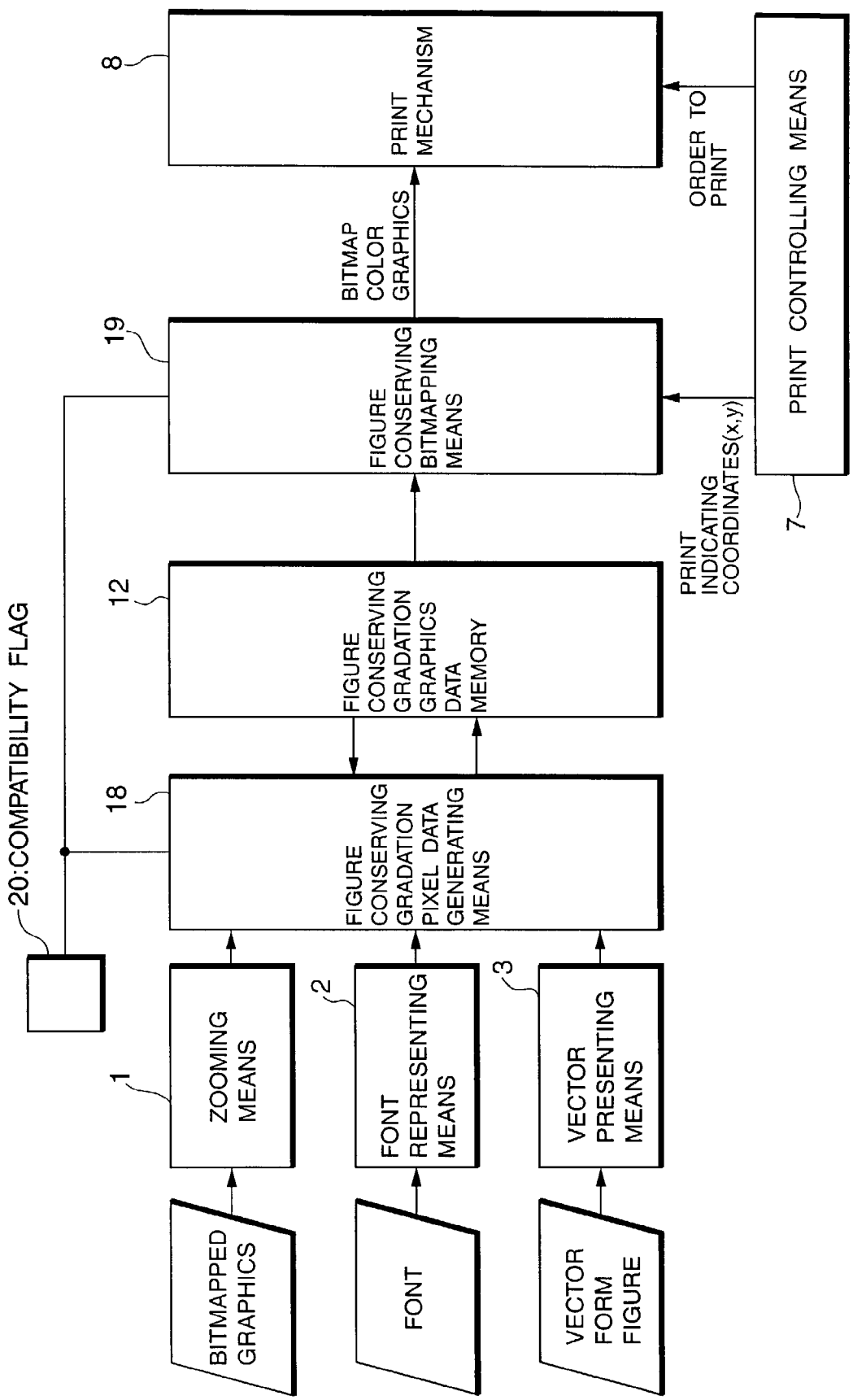
FIG. 10 is a block diagram showing an outline configuration of the graphic processor according to Embodiment 6.

FIG. 10 is a block diagram showing an outline configuration of the graphic processor according to Embodiment 6. This graphic processor comprises a zooming means 1, a font representing means 2, a vector representing means 3, a figure conserving gradation pixel data generating means 18, a figure conserving gradation graphics data memory 12, a figure conserving bitmapping means 19, a compatibility flag 20 which is able to be rewritten freely by program, a print controlling means 7, and a print mechanism 8. And, the output of the compatibility flag 20 is led to both of the figure cons.grad.pixel data generating means 18 and the figure cons.bitmapping means 19. Except the figure cons.grad-pixel data generating means 18, the figure cons.bitmapping means 19 and the compatibility flag 20, the same configuration as the graphic processor of Embodiment 1 is adopted in Embodiment 6.

Figure 11:
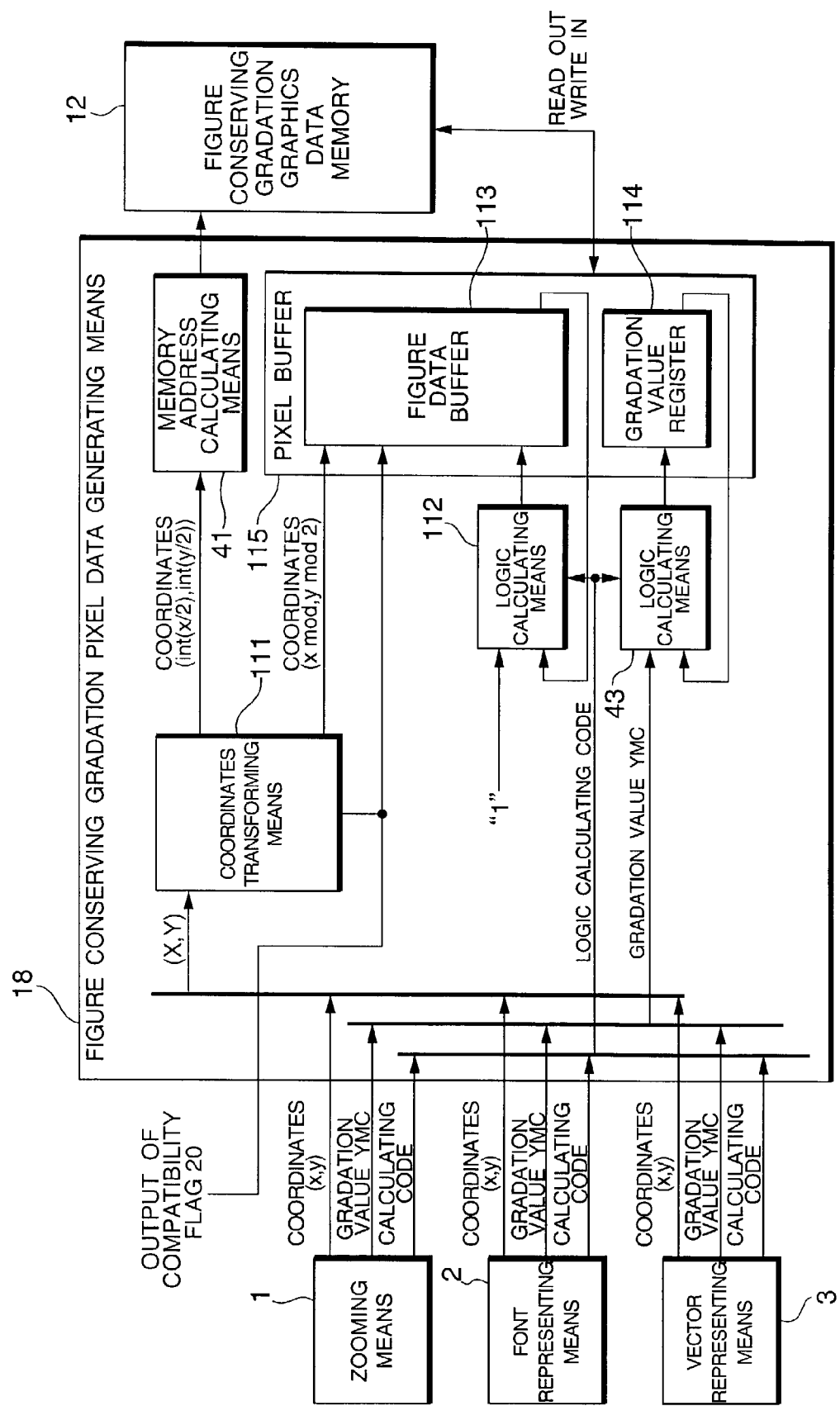
FIG. 11 is a block diagram showing a configuration of the figure conserving gradation pixel data generating means 18.

FIG. 11 is a block diagram showing the configuration of figure cons.grad.pixel data generating means 18. This figure cons.grad.pixel data generating means 18 is made up to lead the output signal from the compatibility flag 20 in both of the figure transforming means 111 and the figure data buffer 113. The other configuration is same as the figure cons.grad.pixel data generating means 11 equipped in the processor of Embodiment 1.

The figure cons.grad.pixel data generating means 18 puts out upper coordinates and lower coordinates when coordinates (x,y) is inputted to the coordinates transforming means 111. In this occasion, these upper and lower coordinates are outputted as shown in next table 1 according to the input signal from the compatibility flag 20.

TABLE 1

| Output of Compatibility Flag 20 | Upper Coordinates | Lower Coordinates |
| --- | --- | --- |
| "0" | (int(x/2), int(y/2)) | (x mod 2, y mod 2) |
| "1" | (x,y) | (0,0) |

As shown in Table 1, the same operation as the processor of Embodiment 1 is processed when the output signal of compatibility flag 20 is "0". On the other hand, the same operation as the conventional printer is processed when the output signal of compatibility flag 20 is "1".

Figure 12:
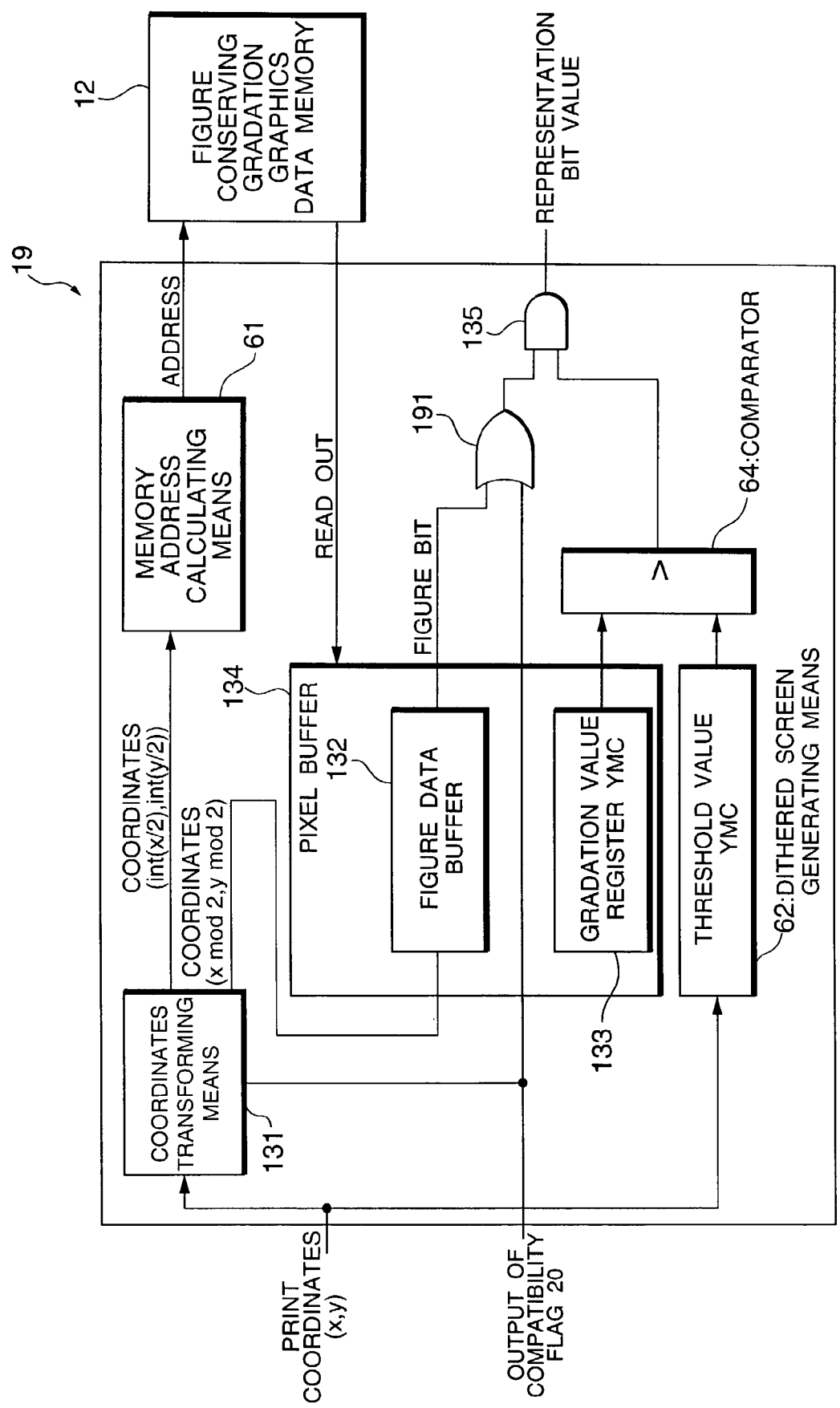
FIG. 12 is a block diagram showing a configuration of the figure conserving bitmapping means 19.

Moreover, FIG. 12 is a block diagram showing the configuration of figure cons.bitmapping means 19. This figure cons.bitmapping means 19 is made up to input the output signal of compatibility flag 20 to newly equipped OR gate 191 as well as the coordinates transforming means 131. And, this OR gate 191 is inputted with the output signal of figure data buffer 132 as well as the output signal of compatibility flag 20. These are logically calculated in OR gate 191. After all, the result is inputted to AND gate 135. The other configuration is same as the configuration of figure cons.bitmapping means 13 equipped in the processor of Embodiment 1.

This coordinates transforming means 131 of figure cons.bitmapping means 19 also performs the same process as the coordinates transforming means 111 of figure cons.grad.pixel data generating means 18. And, the output signal of figure data buffer 132 is inputted to AND gate 135 via OR gate 191 when the output signal of compatibility flag 20 is "0", so as to perform the same operation as the processor shown in Embodiment 1. On the other hand, a fixed signal "1" is inputted to AND gate 135 independently of the output signal of figure buffer 132. Therefore, the representation bit value outputted from AND gate 135 becomes to accord with the output value of comparator 64, so as to perform the same operation as the conventional printer.

Thus, in the graphic processor of Embodiment 6, the same operation as the processor of Embodiment 1 is processed when the output signal of compatibility flag 20 is "0" while the same operation as the conventional printer is processed when the output signal of compatibility flag 20 is "1".

Therefore, making use of the graphic processor of Embodiment 6, the printing process according to the conventional graphic processing method is performed as well as the figure conserving representation method of present invention.

<Embodiment 7>

Although the graphic processor of Embodiment 1 described above is able to print only in the occasion when the gradation representing resolution is 600 DPI and the figure representing resolution is 1200 DPI, Embodiment 7 shows a graphic processor corresponding to plural resolutions. Hereafter in Embodiment 7 described is a method for representing by two kinds of data formats when the resolution of printer is 1200 DPI, which are a data format shown in FIG. 2 (gradation representing resolution 600 DPI, figure representing resolution 1200 DPI) and a data format shown in FIG. 13 (gradation representing resolution 300 DPI, figure representing resolution 1200 DPI). It goes without saying that what the processor of Embodiment 7 can deal with is not limited to these data formats. Any other data formats of resolution can be adopted.

Figure 14:
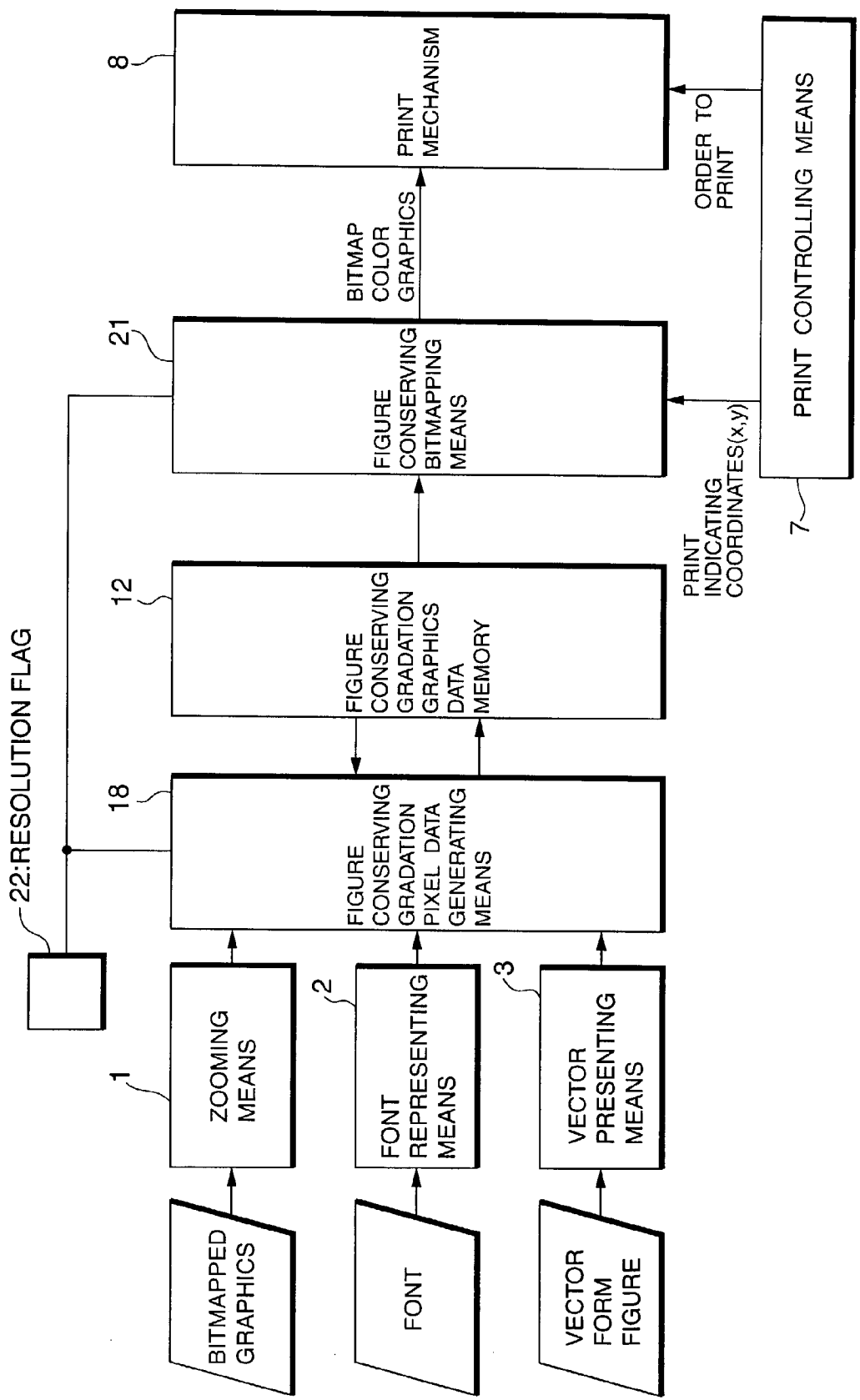
FIG. 14 is a block diagram showing an outline configuration of the graphic processor according to Embodiment 7.

FIG. 14 is a block diagram showing an outline configuration of the graphic processor according to Embodiment 7. The graphic processor of Embodiment 7 is different from the processor of Embodiment 6 in the points that a figure cons.bitmapping means 21 is equipped instead of the figure cons.bitmapping means 19 and a resolution flag 22 is equipped instead of the compatibility flag 20. This resolution flag 22 is able to be rewritten freely by program. The other configuration is same as the processor of Embodiment 6.

Figure 15:
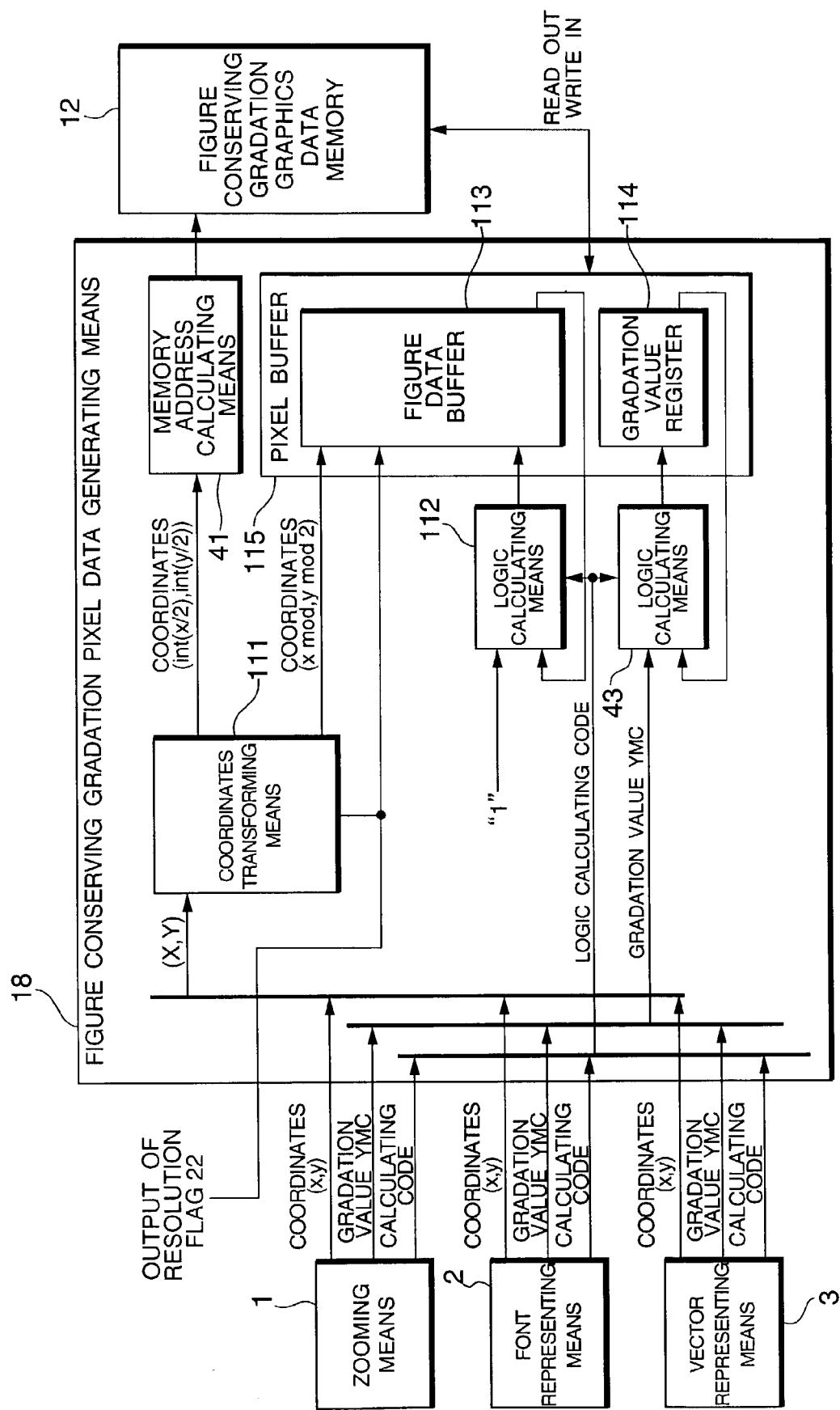
FIG. 15 is a block diagram showing a configuration of the figure conserving gradation pixel data generating means 18 with resolution flag 22 instead of compatibility flag 20.

FIG. 15 is a block diagram showing the configuration of figure cons.grad.pixel data generating means 18. This figure cons.grad.pixel data generating means 18 puts out upper coordinates and lower coordinates when it is inputted with coordinates (x,y). In this occasion, these coordinates are put out as shown in next Table 2 according to the input signal of resolution flag 22.

TABLE 2

| Output of Resolution Flag 22 | Upper Coordinates | Lower Coordinates |
| --- | --- | --- |
| "0" grad. 600DPI fig. 1200DPI | (int(x/2), int(y/2)) | (x mod 2, y mod 2) |
| "1" grad. 300DPI fig. 1200DPI | (int(x/4), int(y/4)) | (x mod 4, y mod 4) |

Figure 13:
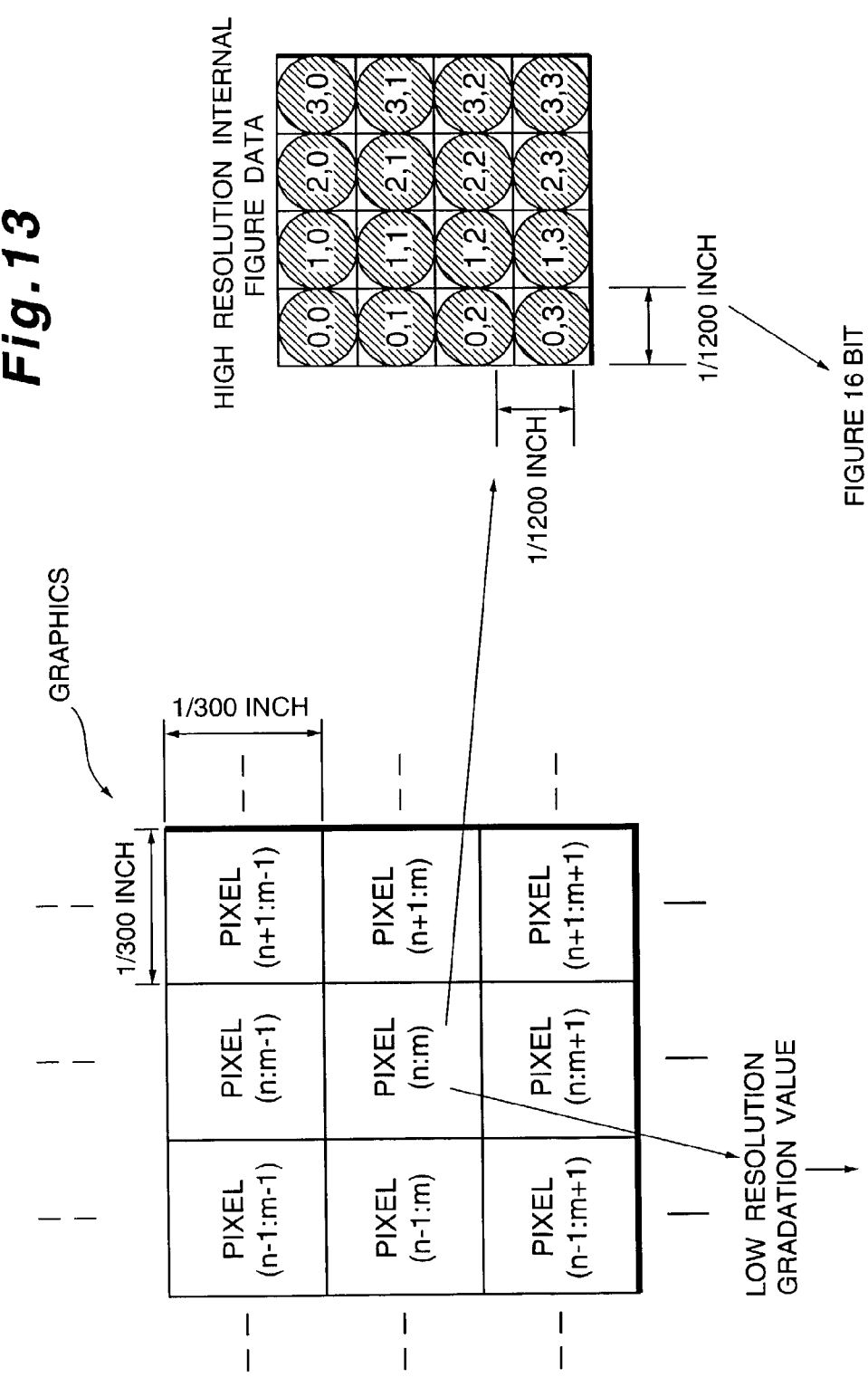
FIG. 13 is a diagram showing a format of figure conserving gradation pixel data with decreased gradation representing resolution.

Moreover, in the occasion of data format shown in FIG. 13, the figure data buffer 113 shown in FIG. 15 is made to have a memory capacity of 16 bits because the figure bits per pixel are 4×4=16 bits. Each bit corresponding to the lower coordinates of Table 2 is read out from these 16 bits. And, it is subjected to logical calculation and is written back in the buffer again.

Figure 16:
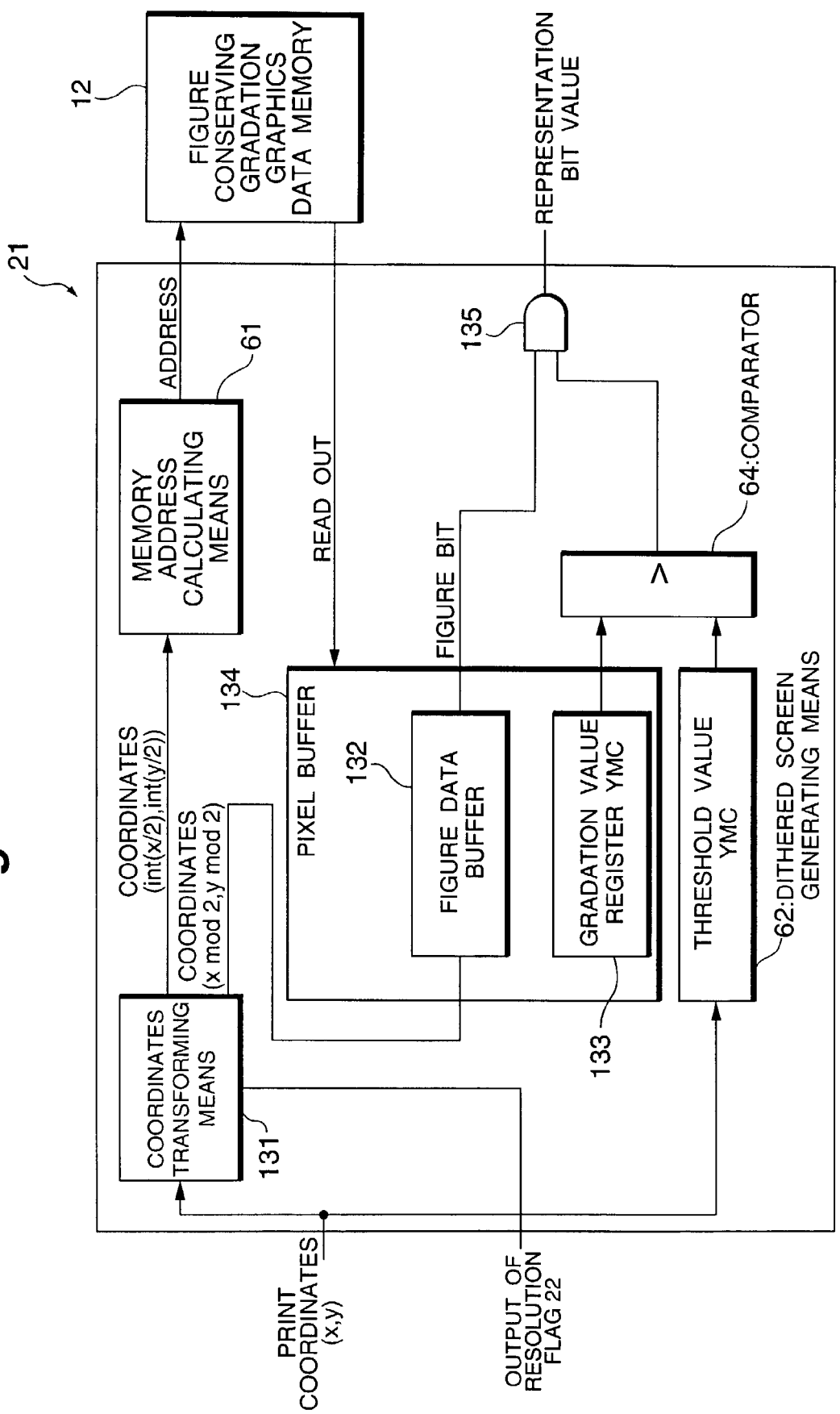
FIG. 16 is a block diagram showing a configuration of the figure conserving bitmapping means 21.

Moreover, FIG. 16 is a block diagram showing the configuration of figure conserving bitmapping means 21. This figure cons.bitmapping means 21 is made up to input the output signal of resolution flag 22 to the coordinates transforming means 131. And, the other configuration is same as the figure cons.bitmapping means 13 of Embodiment 1.

This coordinates transforming means 131 of figure cnos.bitmapping means 21 also performs the operation as shown in Table 2. In addition, the figure data buffer 132 is also made up to have a memory capacity of 16 bits for the same reason as the figure data buffer 113.

The graphic processor of Embodiment 7 performs the same operation as the processor of Embodiemtn1 except the coordinates transforming method shown here. Therefore, the processor of Embodiment 7 is able to process printing with two different resolution between the occasion when the output signal of resolution flag 22 is "0" and the occasion when it is "1".

Thus, according to the graphic processor of Embodiment 7, printing process with two different resolutions becomes to be possible. So, by making use of the processor of Embodiment 7, when the actual printing process is performed, it is able to cope with both demands for preferring print quality and preferring print speed.

That is, the printing process with high resolution (c.f. data format shown in FIG. 2) is able to be performed when print quality is preferred, while the printing process with low resolution (c.f. data format shown in FIG. 13) is able to be performed when print speed is preferred.

<Embodiment 8>

The graphic processing method according to present invention is made up to keep high gradation representing resolution so as to represent the original graphics as it is, when the resolution of bitmap graphics of it is high. However, when no high density bitmap graphics is included in the original graphics data, the data processing coping with high density is not only vain to provide high graphic quality but also causes a problem of print speed drop. Therefore, in Embodiment 8 provided is a graphic processing system, which is able to improve print speed when the resolution of original data is not high, by means of dropping the resolution of intermediate graphics.

Figure 17:
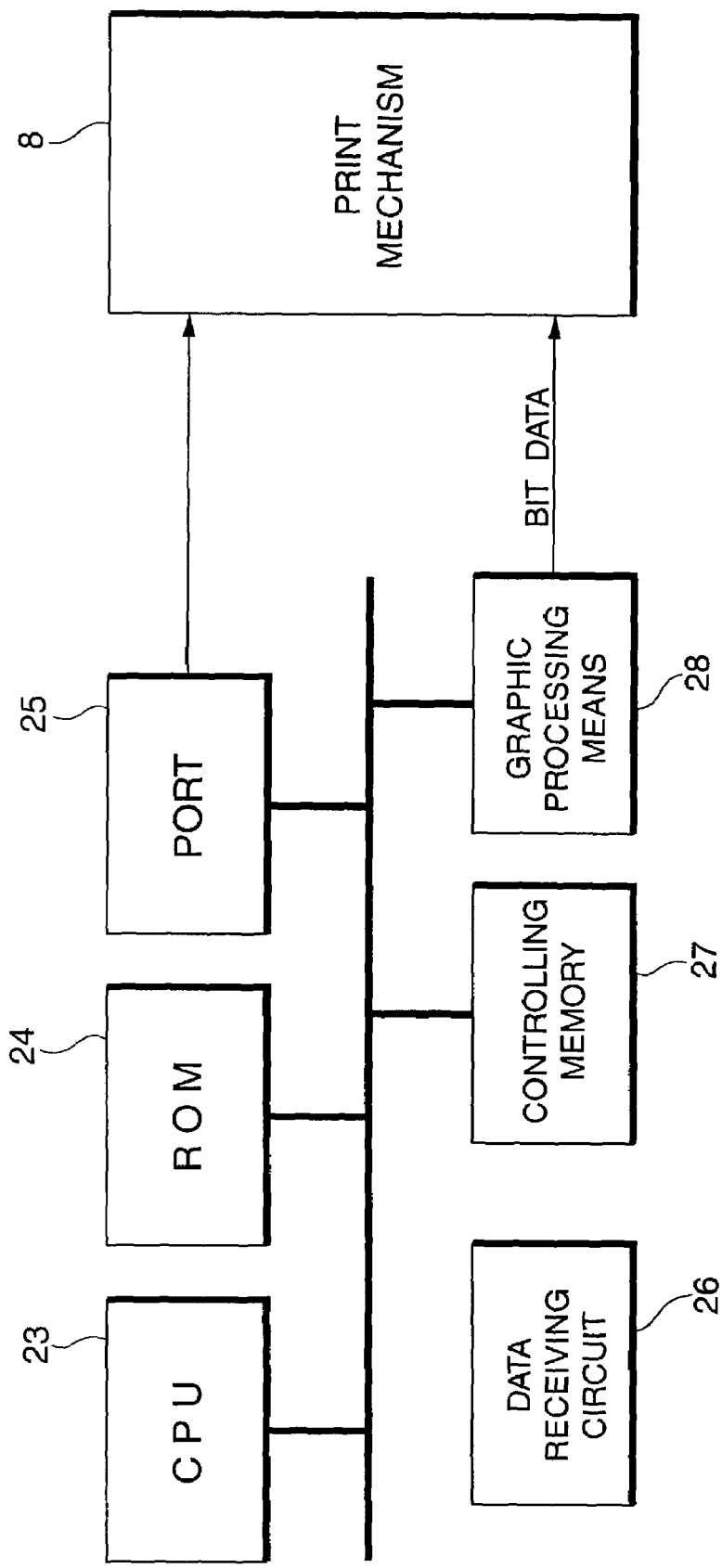
FIG. 17 is a block diagram showing an outline configuration of the graphic processor according to Embodiment 8.

FIG. 17 is a block diagram showing the configuration of the graphic processing system according to Embodiment 8. This system comprises CPU 23, ROM 24, port 25, data receiving circuit for receiving data from outer system not shown in the drawings, controlling memory 27, and graphic processing means 28. And, each element is connected with the system bus. The graphic processing means 28 comprises the graphic processor of Embodiment 7. The operation of system of Embodiment 8 is processed by a program stored in ROM 24. That is, CPU 23 controls data receiving from the outer system, representing and printing while it executes a program stored in ROM 24.

Figure 18:
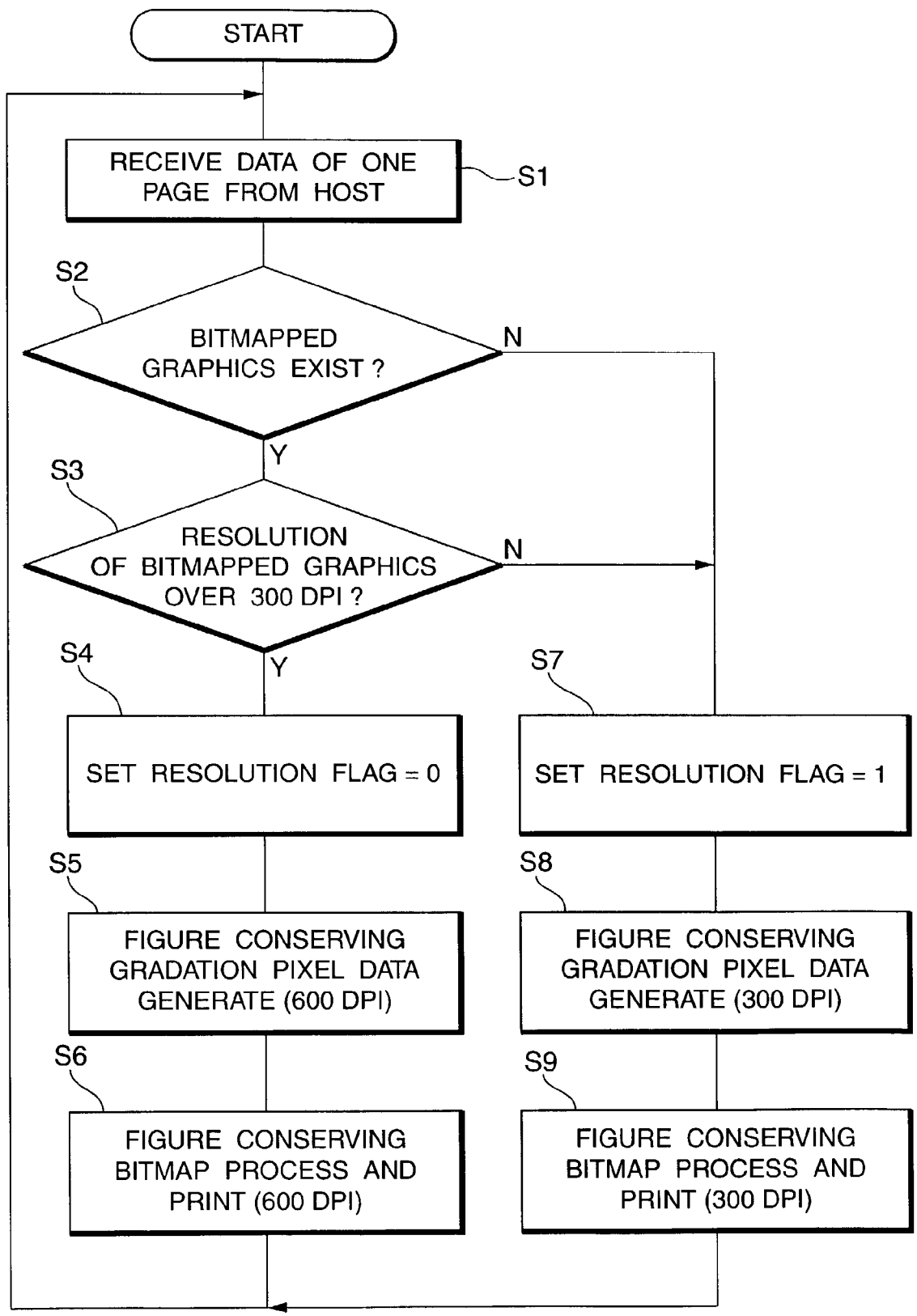
FIG. 18 is a flow-chart showing the operation of the graphic processing system of Embodiment 8.

FIG. 18 is a flowchart showing the operation of graphic processing system of Embodiment 8. Hereinafter referring to this flowchart described is the operation of graphic processing system of Embodiment 8.

To begin with, a page of graphics data is received from the other system not shown in the drawings via the data receiving circuit 26 (step S1). In this occasion, CPU 23 abstracts bitmap graphics, texts, figure data etc. while it decodes commands included in the graphics data.

Next, CPU 23 judges whether bitmap graphics exist or not (step S2). In this occasion, the process proceeds to step S3 when bitmap graphics exist. On the other hand, it proceeds to step S7 when bitmap graphics do not exist.

Next, CPU 23 judges whether the resolution is higher than 300 DPI or not when bitmap graphics exist (step S3). The process proceeds to step S4 if it is higher than or equal to 300 DPI. On the other hand, the process proceeds to step S7 if it is lower than 300 DPI.

Next, CPU 23 sets the output from resolution flag 22 of graphic processing means 28 (c.f. graphic processor of Embodiment 7) to "0" (step S4).

Next, CPU 23 operates the figure cons.grad.pixel data generating means 18 (c.f. FIG. 15) of graphic processing means 28. And, it writes a page of graphics data consisted of figure cons.grad.pixel data generated here in the figure cons.grad.graphics data memory 12 (step S5). In this occasion, the data is processed with gradation representing resolution 600 DPI and figure representing resolution 1200 DPI because the output signal of resolution flag 22 is "0".

And, the data in figure cons.grad.graphics data memory 12 is bitmapped by the figure cons.bitmapping means 21 (c.f. FIG. 16) of graphic processing means 28, so as to be put out to the print mechanism 8 and printed (step S6). After completing print, the process proceeds back to step S1 again.

On the other hand, CPU 23 sets the output from resolution flag 22 of graphic processing means 28 to "1" (step S7) when it is judged that bitmap graphics do not exist at step S2 or when it is judged that the resolution of bitmap graphics is lower than 300 DPI.

Next, CPU 23 operates the figure cons.grad.pixel data generating means 18 of graphic processing means 28. And, it writes a page of graphics data consisted of figure cons.grad.pixel data generated here in the figure cons.grad.graphics data memory 12 (step S8). In this occasion, the data is processed with gradation representing resolution 300 DPI and figure representing resolution 1200 DPI because the output signal of resolution flag 22 is "1".

Next, the data in figure cons.grad.graphics data memory 12 is bitmapped by the figure cons.bitmapping means 21 of graphic processing means 28, so as to be put out to the print mechanism 8 and printed (step S9). After completing print, the process proceeds back to step S1 again.

By repeating these processes, the printing process is performed.

Thus, according to the graphic processing system of Embodiment 8, the print quality is able to be improved by performing graphic process with high internal gradation resolution when the resolution of original graphics data is high. On the other hand, the print speed is able to be increased by performing graphic process with dropped internal gradation resolution when the resolution of original graphics data is low. As a result of this, the optimum printer control is able to be performed corresponding to the resolution of original graphics data.

<Embodiment 9>

As mentioned before, the graphic processing method of present invention is made up to keep high gradation representing resolution so as to represent the original graphics as it is, when the resolution of bitmap graphics of original graphic data is high. For this reason, it needs a large capacity of memory to realize high density bitmap graphic processing. So, the cost of device is likely to increase.

Therefore, the graphic processing system of Embodiment 9 is aimed at suppressing the device cost by enabling control of resolution of graphics to be processed according to the memory capacity installed in the graphic processor.

The configuration of graphic processing system according to Embodiment 9 is same as what is shown in FIG. 17. The different point is that the memory capacity checking process is comprised in the course of graphic processing. The system of Embodiment 9 is also operated by a program stored in ROM 24. Hereinafter, it is described in detail.

Figure 19:
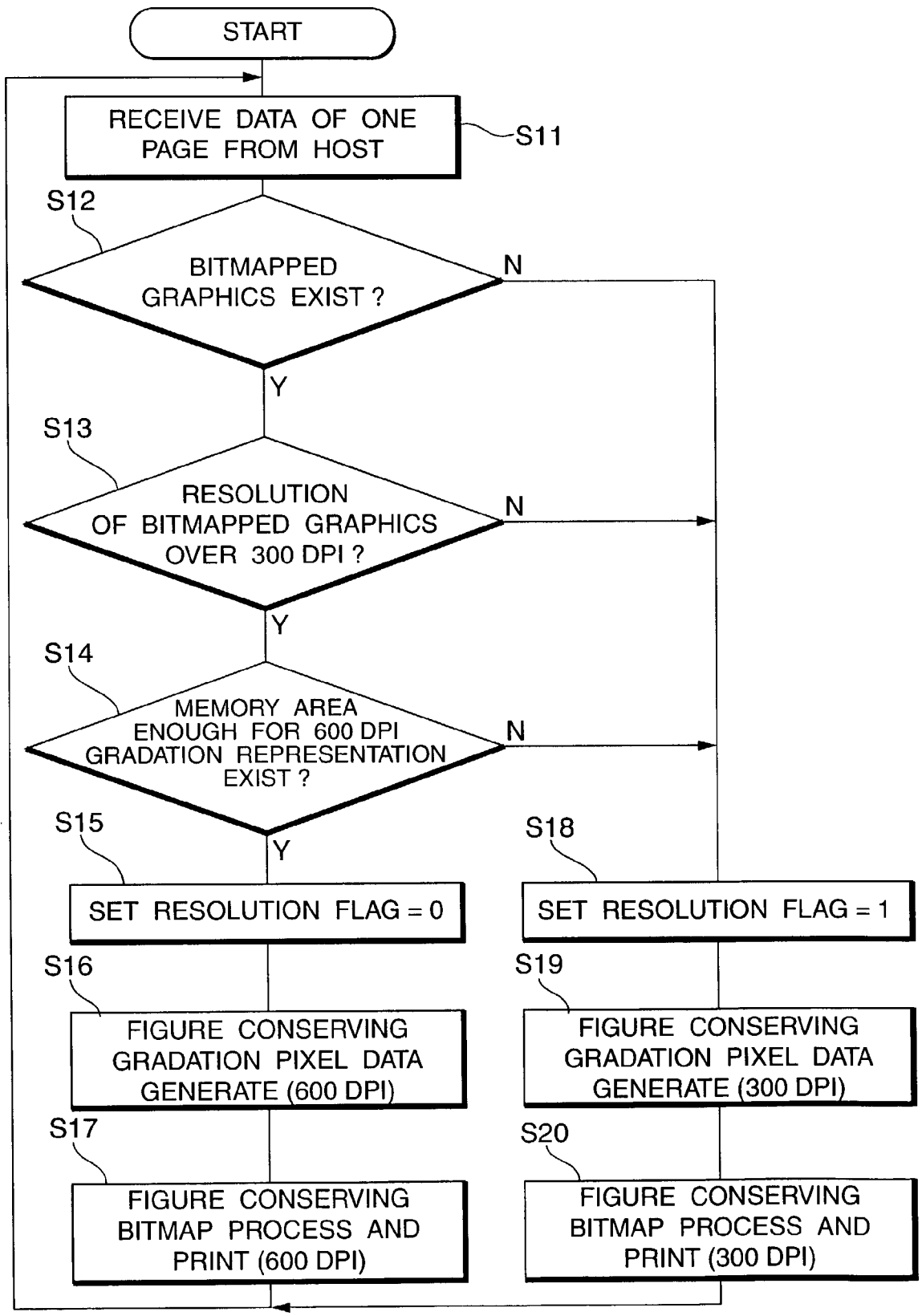
FIG. 19 is a flow-chart showing the operation of the graphic processing system of Embodiment 9.
Figure 20:
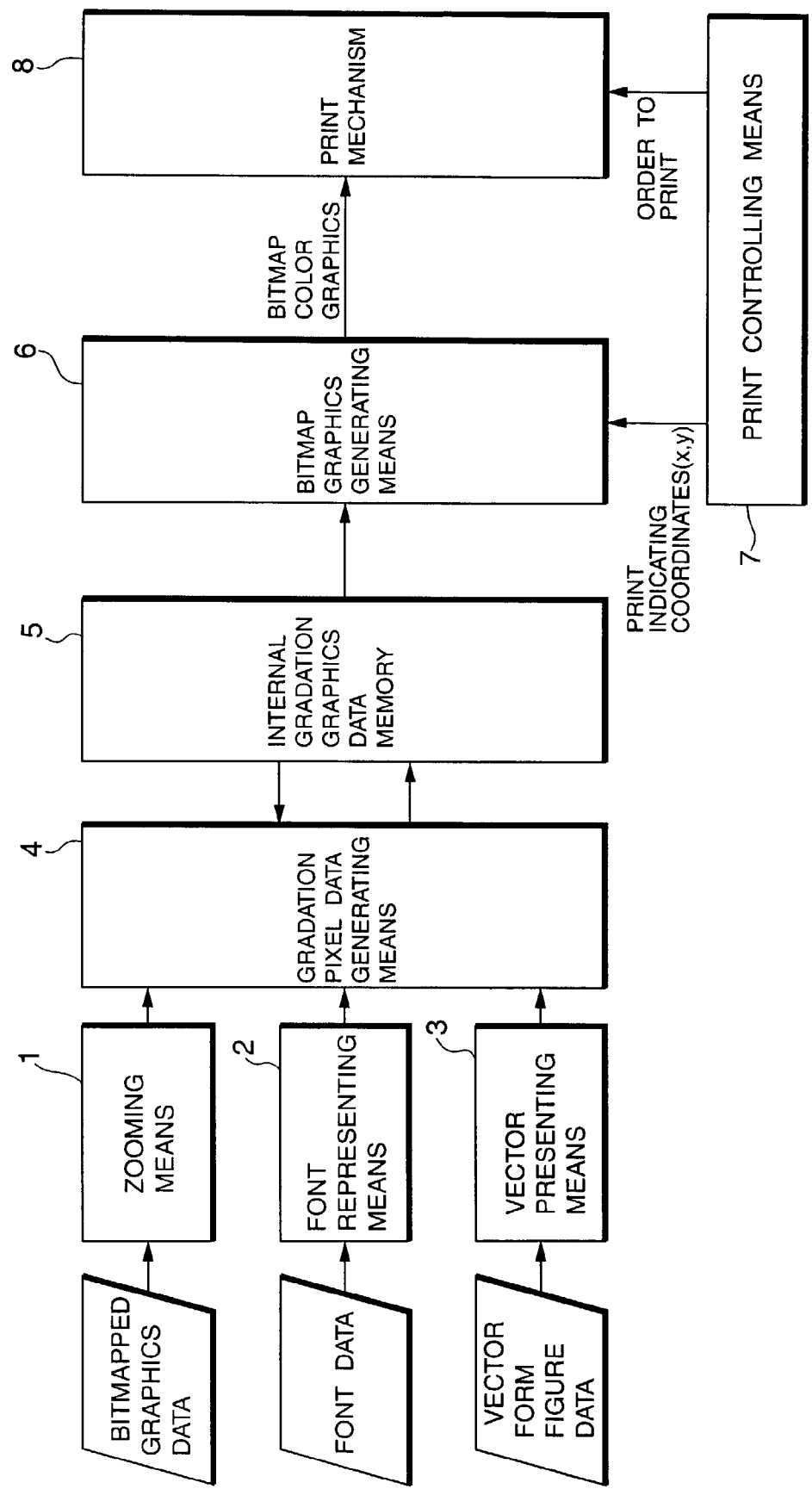
FIG. 20 is a block diagram showing an outline configuration of the conventional graphic processor.
Figure 21:
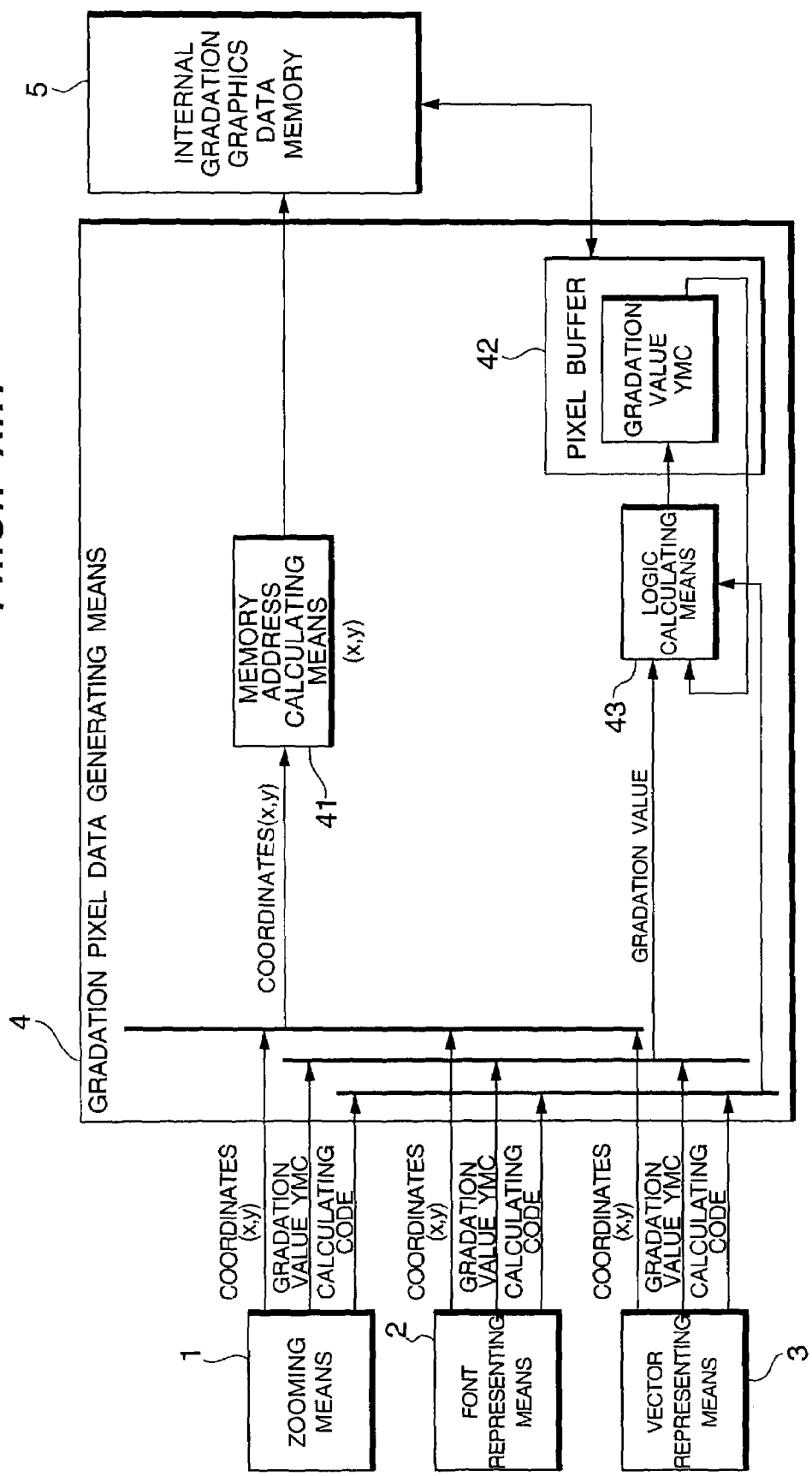
FIG. 21 is a block diagram showing a configuration of the conventional gradation pixel data generating means.

FIG. 19 is a flowchart showing the operation of graphic processing system of Embodiment 9. Hereafter referring to this flowchart, the operation of graphic processing system of Embodiment 9 is described.

To begin with, a page of graphics data is received from the other system (step S11). In this occasion, CPU 23 abstracts bitmap graphics, texts, figure data etc. while it decoding commands included in the graphics data.

Next, CPU 23 judges whether bitmap graphics exists or not (step S12). In this occasion, the process proceeds to step S13 if bitmap graphics exist. On the other hand, the process proceeds to step S18 if bitmap graphics do not exist.

Next, CPU 23 judges whether the resolution is more than or equal to 300 DPI when bitmap graphics exist (step S13). The process proceeds to step S14 if it is more than equal to 300 DPI. On the other hand, the process proceeds to step S18 if it is less than 300 DPI.

Next, CPU 23 looks into the capacity of figure cons.grad.graphics data memory 12 of graphic processing means 28 (c.f. graphic processor of Embodiment 7). And, it judges whether necessary capacity for representing with 600 DPI gradation is remained or not (step S14). As a result of judgement, if enough memory capacity is remained, the process proceeds to step S15. Otherwise, the process proceeds to step S18.

Next, CPU 23 sets the output from resolution flag 22 of graphic processing means 28 to "0" (step S15).

Next, CPU 23 operates the figure cons.grad.pixel data generating means 18 (c.f. FIG. 15) of graphic processing means 28. And, it writes a page of graphics data consisted of the figure cons.grad.pixel data generated here in the figure cons.grad.graphics data memory 12 (step S16). In this occasion, the data is processed with gradation representing resolution 600 DPI and figure representing resolution 1200 DPI because the output signal of resolution flag 22 is "0".

And, the data in figure cons.grad.graphics data memory 12 is bitmapped by the figure cons.bitmapping means 21 (c.f. FIG. 16) of graphic processing means 28, so as to be put out to the print mechanism 8 and printed (step S17). After completing printing, the process proceeds back to step S1 again.

On the other hand, when it is judged that bitmap graphics do not exist at step S12, when it is judged that the resolution of bitmap graphics is less than 300 DPI at step S13, or when necessary memory capacity for representing 600 DPI gradation is not remained, CPU 23 sets the output from resolution flag 22 of graphic processing means 28 to "1" (step S18) . . .

Next, CPU 23 operates the figure cons.grad.pixel data generating means 18 (c.f. FIG. 15) of graphic processing means 28. And, it writes a page of graphics data consisted of figure cons.grad.pixel data generated here in the figure cons.grad.graphics data memory 12 (step S19). In this occasion, the data is processed with gradation representing resolution 300 DPI and figure representing resolution 1200 DPI because the output signal of resolution flag 22 is "1".

And, the data in figure cons.grad.graphics data memory 12 is bitmapped by the figure cons.bitmapping means 21 of graphic processing means 28, so as to be put out to the print mechanism 8 and printed (step S20). After completing printing, the process proceeds back to step S11 again.

By repeating these processes, the printing process is performed.

Thus, according to the graphic processing system of Embodiment 9, gradation representing resolution is able to be controlled corresponding to the memory capacity installed in the graphic processor. Therefore, printing is able to be processed with gradation resolution of 300 DPI when only small capacity of memory is installed in the graphic processor. And, only in the occasion when the user demands a high resolution printing, the user can install necessary capacity of memory in addition as an option. Therefore, in the occasion when the user demands only low resolution printing, it is not necessary for the user to install optional memory in vain. As a result, cost up of device is able to be prevented.

Although Embodiments of present invention are described referring to the drawings, the present invention is not limited to these embodiments. It goes without saying that each Embodiment is able to be changed or improved within the scope of the claims appended hereafter. For example, the present invention is adopted to monochrome printer as well as color printer.

What is claimed is:

1. A graphic processor for processing presentation of pixel graphics comprising:
a gradation data generating section to divide inputted graphics data into regions comprised of plural pixels and read a pointed region including plural first gradation data of plural pixels with first positioning data out of divided inputted graphics data, so as to generate second gradation data from the plural first gradation data in the read out pointed region;
a figure data generating section to generate figure data corresponding to the first positioning data by comparing the first gradation data with the second gradation data; and
a figure conserving gradation graphics data memory to memorize the second gradation data and figure data of each pointed region.

2. A graphic processor according to claim 1 wherein the figure data is bitmap data, and the figure data generating section selects the figure data from either value of a certain color or a white color which the figure data can take.

3. A graphic processor according to claim 1 further comprising:
a second graphics data transforming section to read the second gradation data with figure data out of the figure conserving gradation graphics data, so as to transform it into another pointed region including plural second gradation data with second positioning data;
wherein the gradation data generating section generates third gradation data from the plural first gradation data in the read out pointed region and the plural second gradation data in the memorized pointed region,
the figure data generating section generates figure data by comparing third gradation data with the second gradation data.

4. A graphic processor according to claim 3 wherein the figure conserving gradation graphics data memory memorizes the third gradation data and figure data as the second gradation data and figure data.

5. A graphic processor according to claim 1 further comprising:
a bitmapping means including an edge detecting means to detect figure data of edge wherein the outputting bit is always painted at the edges.

6. A graphic processor according to claim 5 wherein the bitmapping means further includes an edge emphasis valid or invalid flag to decide whether the outputting bit is always painted at edges or not.

7. A graphic processor according to claim 5 wherein the bitmapping means further includes a comparator to decide that the outputting bit is always painted at edges only when the gradation value exceeded the prescribed value.

8. A graphic processor according to claim 1 further comprising:
a compatibility flag to enable to select the conventional graphic processing.

9. A graphic processor according to claim 1 further comprising:
a resolution flag to enable to choose resolution of pixel to be printed.

10. A graphic processor according to claim 1 wherein the gradation data generating section comprises:
   (i) a coordinates transforming means to transform the inputted coordinates of the first positioning data into a reduced coordinates of the second positioning data; and
   (ii) a gradation value register for storing gradation value to be memorized in the graphics data memory.

11. A graphic processor according to claim 1 wherein the figure data generating section comprises:
   (i) a coordinates transforming means to transform the inputted coordinates into regional coordinates; and
   (ii) a figure data buffer for storing each of bits to be memorized with the gradation value.

12. A graphic processor according to claim 3 wherein the second graphics data transforming section comprises:
   (i) a pixel buffer for storing the second gradation data with figure data out of the graphics data memory;
   (ii) a first logic calculating means to calculate third gradation data between the inputted first gradation data and the second gradation data stored in the pixel buffer; and
   (iii) a second logic calculating means to calculate another figure data.

\* \* \* \* \*